(12) United States Patent
Lincourt, Jr. et al.

(10) Patent No.: US 12,086,144 B2
(45) Date of Patent: Sep. 10, 2024

(54) METADATA-BASED FEATURE EXPANSION FOR AUTOMATED MACHINE LEARNING PROCESSES

(71) Applicant: Dell Products L.P., Round Rock, TX (US)

(72) Inventors: Robert Anthony Lincourt, Jr., Franklin, MA (US); Stephen James Todd, North Andover, MA (US); Eloy Francisco Macha, Crowley, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 18/162,347

(22) Filed: Jan. 31, 2023

(65) Prior Publication Data
US 2024/0256552 A1    Aug. 1, 2024

(51) Int. Cl.
| | | |
|---|---|---|
| G06F 7/00 | (2006.01) | |
| G06F 16/00 | (2019.01) | |
| G06F 16/2457 | (2019.01) | |
| G06F 16/28 | (2019.01) | |

(52) U.S. Cl.
CPC ...... *G06F 16/24573* (2019.01); *G06F 16/285* (2019.01)

(58) Field of Classification Search
None
See application file for complete search history.

(56) References Cited

U.S. PATENT DOCUMENTS

| | | | |
|---|---|---|---|
| 2018/0277246 A1* | 9/2018 | Zhong | A61B 5/746 |
| 2019/0243910 A1* | 8/2019 | Wang | G06F 16/51 |
| 2019/0362249 A1* | 11/2019 | Rogynskyy | G06F 16/9035 |

* cited by examiner

*Primary Examiner* — Tuan A Pham
(74) *Attorney, Agent, or Firm* — Chamberlain, Hrdlicka, White, Williams & Aughtry; Aly Z. Dossa

(57) ABSTRACT

A method and system for metadata-based feature expansion for automated machine learning processes. In machine learning, feature selection—or a method through model inputs are reduced in dimensionality by retaining the relevant features, while also discarding the noise, thereof—often plays a pivotal role in the availability of algorithm(s) to derive model(s) from, the optimizing of said model(s) through training and/or testing, and, ultimately, the reaching of acceptable performance thresholds evaluating said model(s), which leads to their implementation in solving real-world problems. Embodiments disclosed herein, accordingly, leverage captured dataset metadata, as well as graph techniques, to identify and suggest one or more supplemental features distinct from original features for, and yet relevant to, the real-world problem and any machine learning models being evaluated.

15 Claims, 30 Drawing Sheets

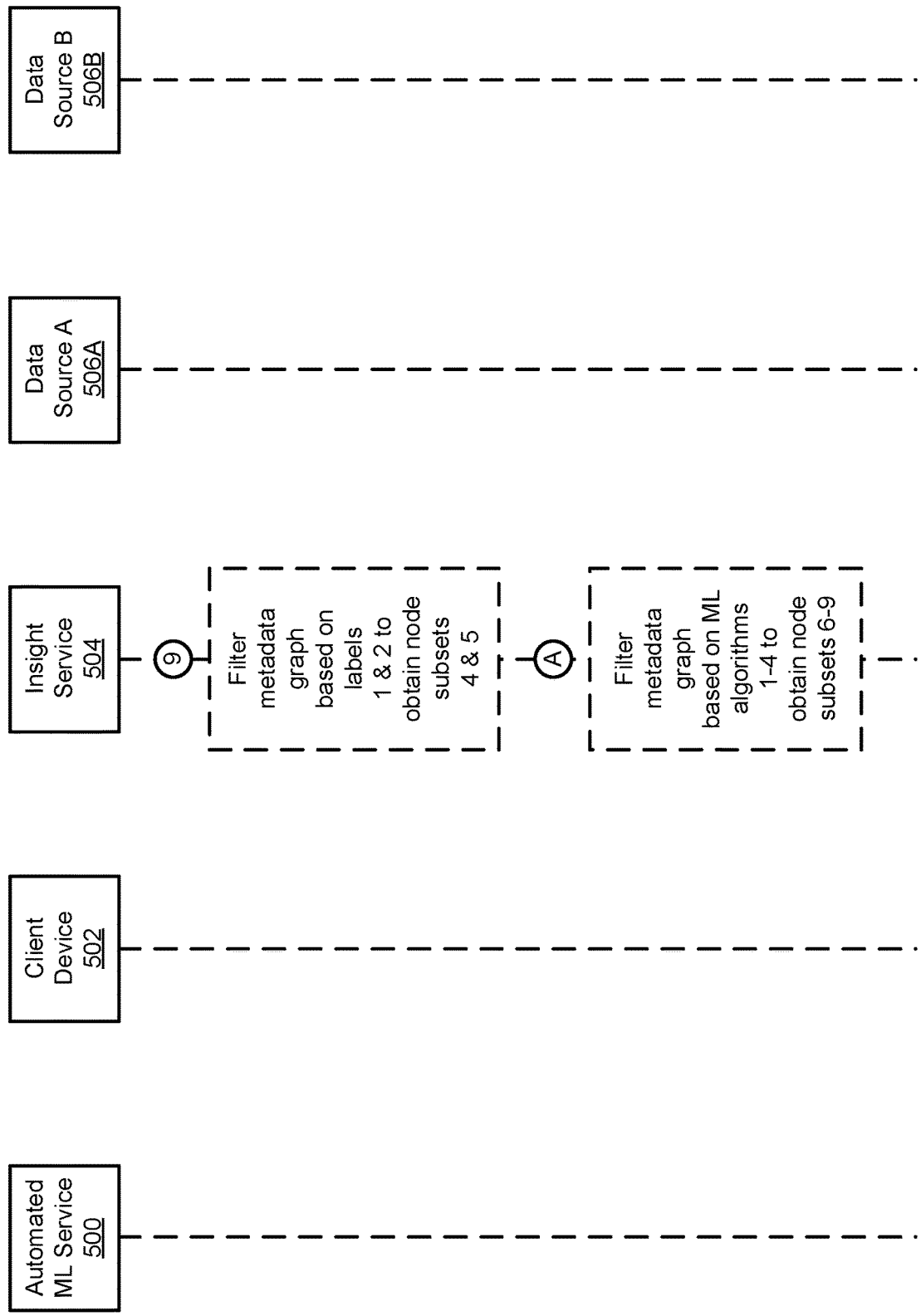

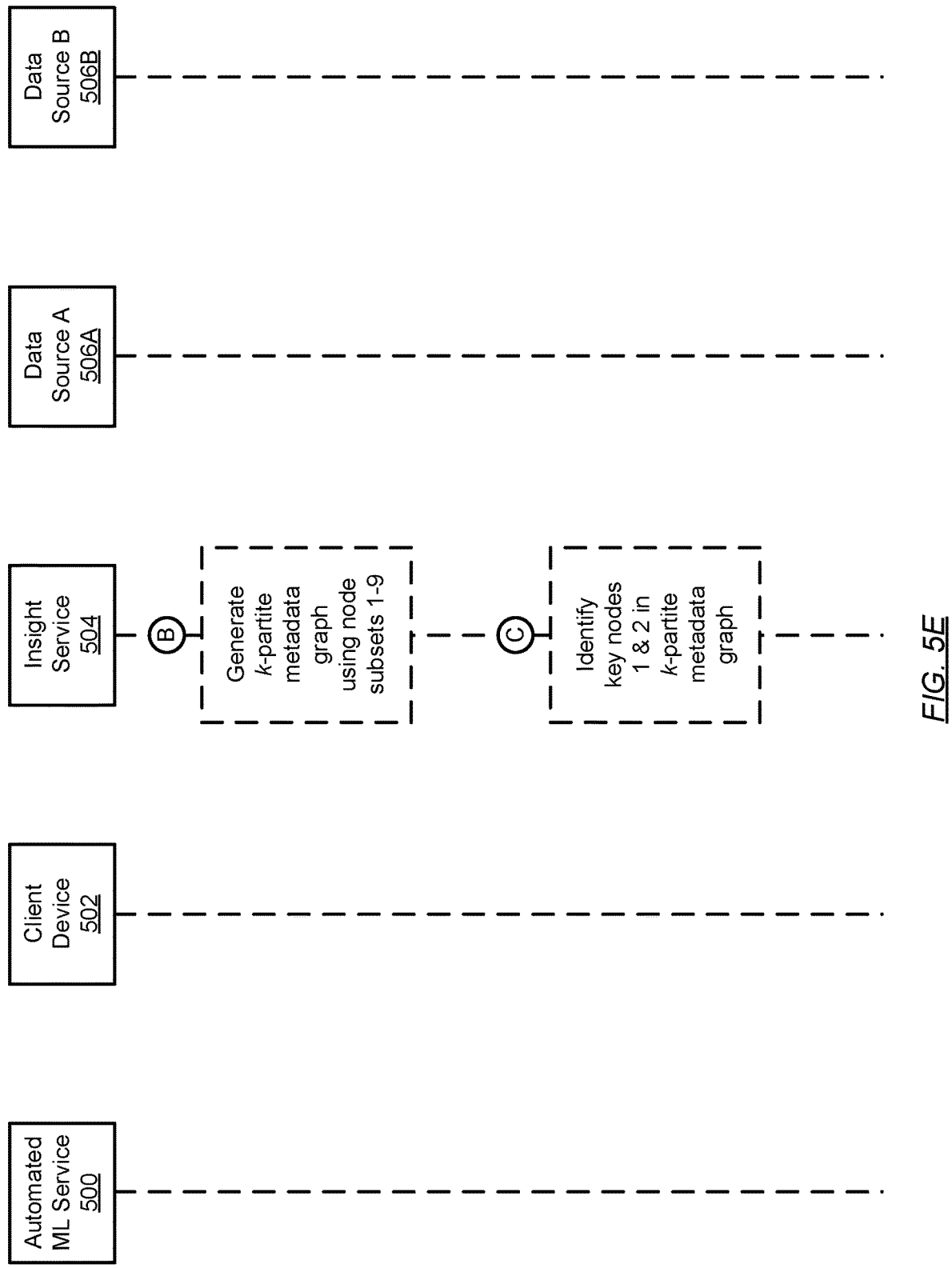

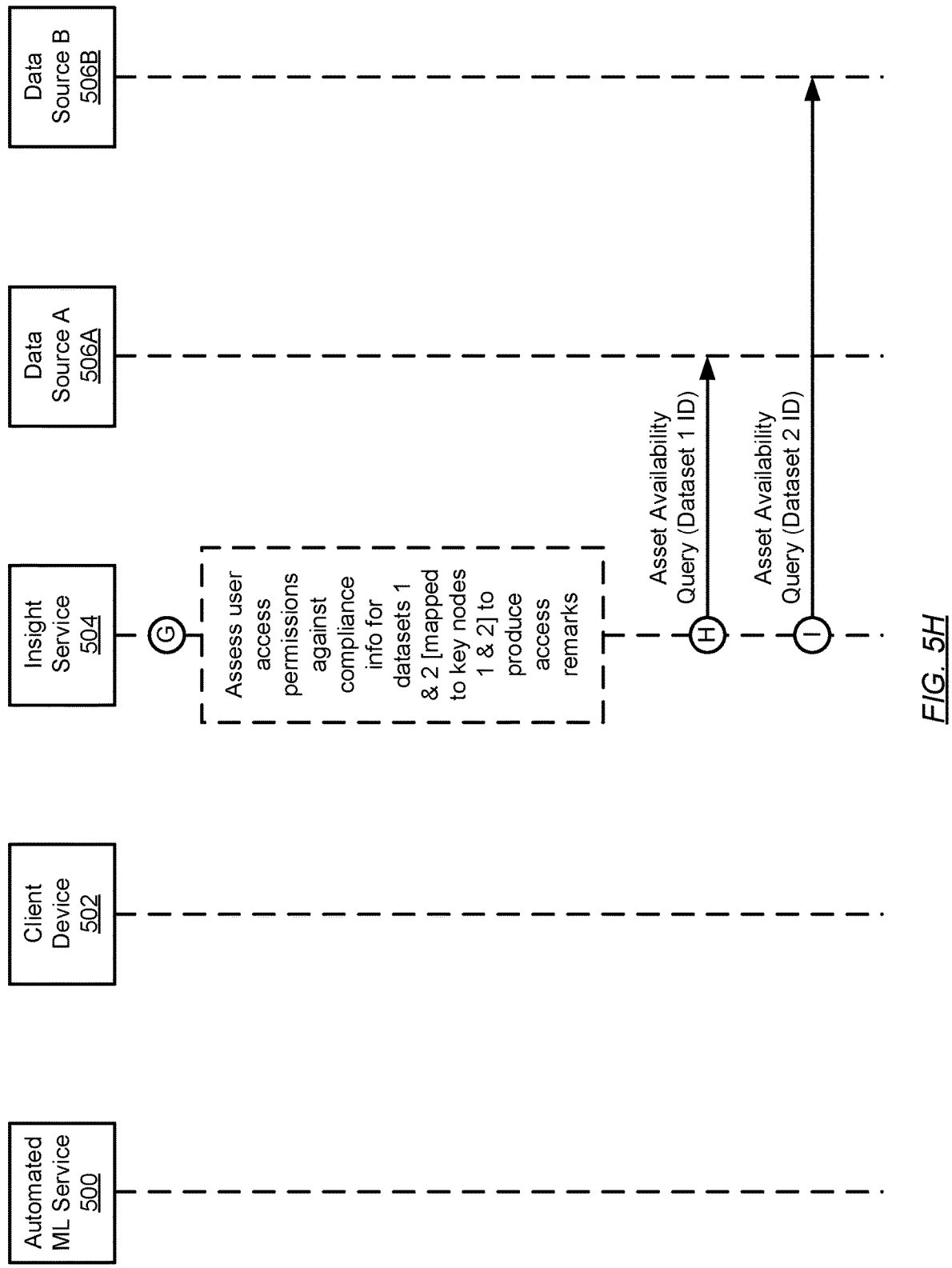

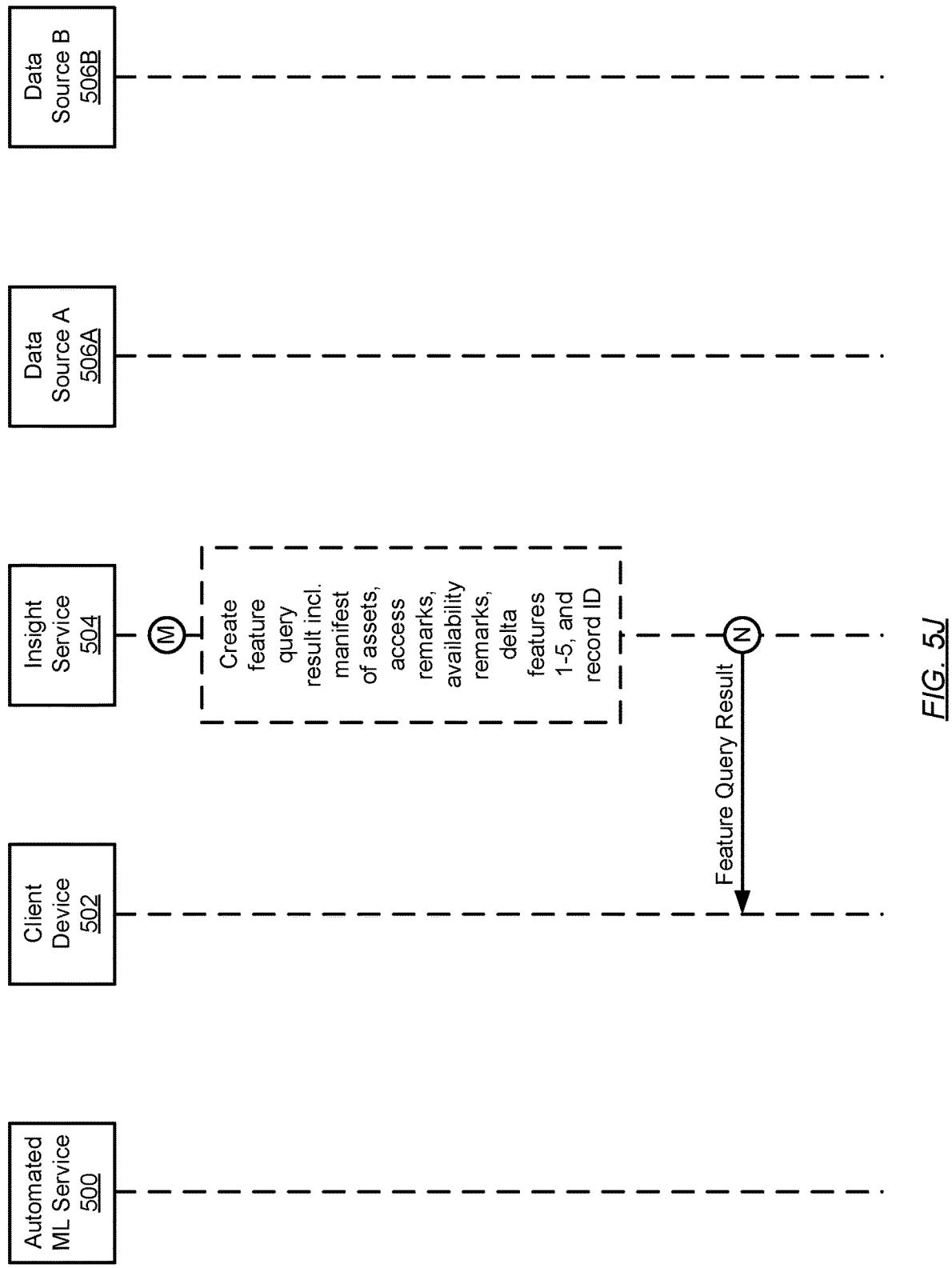

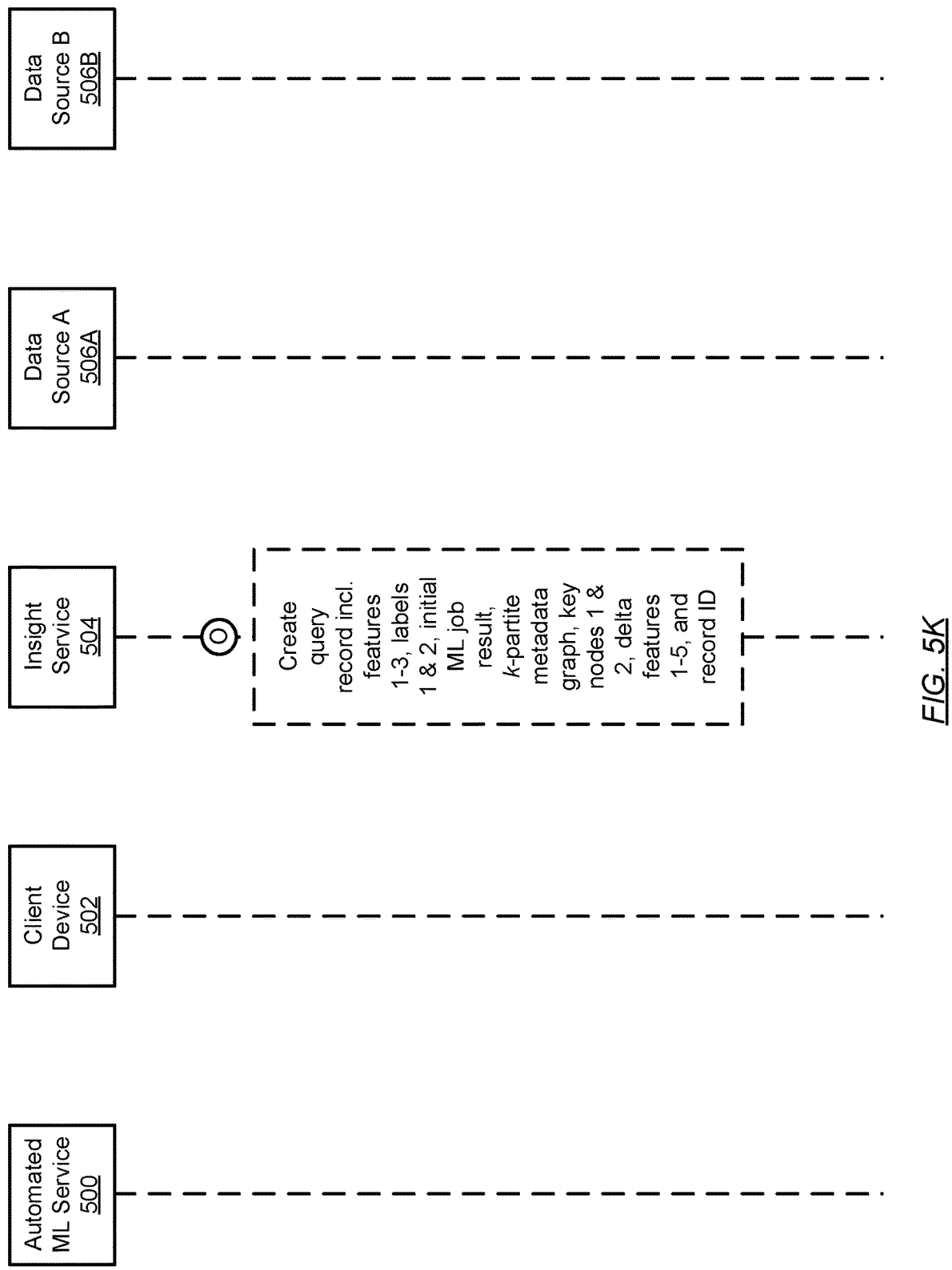

METADATA-BASED FEATURE EXPANSION FOR AUTOMATED MACHINE LEARNING PROCESSES

BACKGROUND

Organization strategy may reference a plan (or a sum of actions), intended to be pursued by an organization, directed to leveraging organization resources towards achieving one or more long-term goals. Said long-term goal(s) may, for example, relate to identifying or predicting future or emergent trends across one or more industries. Digitally-assisted organization strategy, meanwhile, references the scheming and/or implementation of organization strategy, at least in part, through insights distilled by artificial intelligence.

SUMMARY

In general, in one aspect, embodiments disclosed herein relate to a method for processing feature queries. The method includes: receiving a feature query including a set of features; obtaining a metadata graph representative of an asset catalog; filtering, based on each feature in the set of features, the metadata graph to identify a set of node subsets; generating a k-partite metadata graph using the set of node subsets; and identifying a set of delta features based on the k-partite metadata graph.

In general, in one aspect, embodiments disclosed herein relate to a non-transitory computer readable medium (CRM). The non-transitory CRM includes computer readable program code, which when executed by a computer processor, enables the computer processor to perform a method for processing feature queries. The method includes: receiving a feature query including a set of features; obtaining a metadata graph representative of an asset catalog; filtering, based on each feature in the set of features, the metadata graph to identify a set of node subsets; generating a k-partite metadata graph using the set of node subsets; and identifying a set of delta features based on the k-partite metadata graph.

In general, in one aspect, embodiments disclosed herein relate to a system. The system includes: a client device; and an insight service operative connected to the client device, and including a computer processor configured to perform a method for processing feature queries. The method includes: receiving, from the client device, a feature query including a set of features; obtaining a metadata graph representative of an asset catalog; filtering, based on each feature in the set of features, the metadata graph to identify a set of node subsets; generating a k-partite metadata graph using the set of node subsets; and identifying a set of delta features based on the k-partite metadata graph.

Other aspects disclosed herein will be apparent from the following description and the appended claims.

DETAILED DESCRIPTION

Figure 1A:
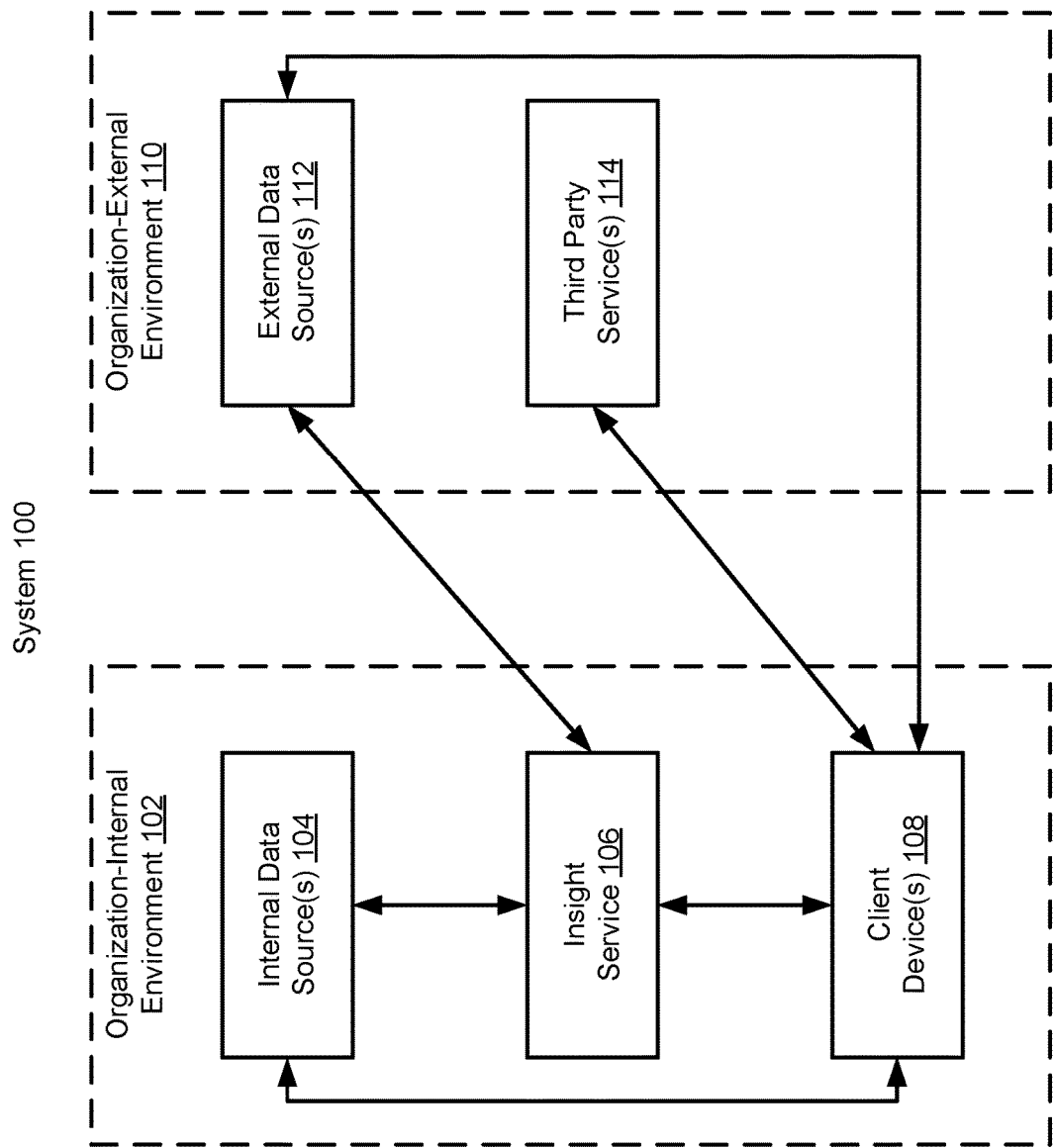
FIG. 1A shows a system in accordance with one or more embodiments disclosed herein.

Specific embodiments disclosed herein will now be described in detail with reference to the accompanying figures. In the following detailed description of the embodiments disclosed herein, numerous specific details are set forth in order to provide a more thorough understanding disclosed herein. However, it will be apparent to one of ordinary skill in the art that the embodiments disclosed herein may be practiced without these specific details. In other instances, well-known features have not been described in detail to avoid unnecessarily complicating the description.

In the following description of FIGS. 1A-5O, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments disclosed herein relate to metadata-based feature expansion for automated machine learning processes. In machine learning, feature selection—or a method through model inputs are reduced in dimensionality by retaining the relevant features, while also discarding the noise, thereof—often plays a pivotal role in the availability of algorithm(s) to derive model(s) from, the optimizing of said model(s) through training and/or testing, and, ultimately, the reaching of acceptable performance thresholds evaluating said model(s), which leads to their implementation in solving real-world problems. Embodiments disclosed herein, accordingly, leverage captured dataset metadata, as well as graph techniques, to identify and suggest one or more supplemental features distinct from original features for, and yet relevant to, the real-world problem and any machine learning models being evaluated.

FIG. 1A shows a system in accordance with one or more embodiments disclosed herein. The system (100) may include an organization-internal environment (102) and an organization-external environment (110). Each of these system (100) components is described below.

In one or many embodiment(s) disclosed herein, the organization-internal environment (102) may represent any digital (e.g., information technology (IT)) ecosystem belonging to, and thus managed by, an organization. Examples of said organization may include, but are not limited to, a business/commercial entity, a higher education school, a government agency, and a research institute. The organization-internal environment (102), accordingly, may at least reference one or more data centers of which the organization is the proprietor. Further, the organization-internal environment (102) may include one or more internal data sources (104), an insight service (106), and one or more client devices (108). Each of these organization-internal environment (102) subcomponents may or may not be co-located, and thus reside and/or operate, in the same physical or geographical space. Moreover, each of these organization-internal environment (102) subcomponents is described below.

In one or many embodiment(s) disclosed herein, an internal data source (104) may represent any data source belonging to, and thus managed by, the above-mentioned organization. A data source, in turn, may generally refer to a location where data or information (also referred to herein as one or more assets) resides. An asset, accordingly, may be exemplified through structured data/information (e.g., tabular data/information or a dataset) or through unstructured data/information (e.g., text, an image, audio, a video, an animation, multimedia, etc.). Furthermore, any internal data source (104), more specially, may refer to a location that stores at least a portion of the asset(s) generated, modified, or otherwise interacted with, solely by entities (e.g., the insight service (106) and/or the client device(s) (108)) within the organization-internal environment (102). Entities outside the organization-internal environment may not be permitted to access any internal data source (104) and, therefore, may not be permitted to access any asset(s) maintained therein.

Moreover, in one or many embodiment(s) disclosed herein, any internal data source (104) may be implemented as physical storage (and/or as logical/virtual storage spanning at least a portion of the physical storage). The physical storage may, at least in part, include persistent storage, where examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one or many embodiment(s) disclosed herein, the insight service (106) may represent information technology infrastructure configured for digitally-assisted organization strategy. In brief, organization strategy may reference a plan (or a sum of actions), intended to be pursued by an organization, directed to leveraging organization resources towards achieving one or more long-term goals. Said long-term goal(s) may, for example, relate to identifying or predicting future or emergent trends across one or more industries. Digitally-assisted organization strategy, meanwhile, references the scheming and/or implementation of organization strategy, at least in part, through insights distilled by artificial intelligence. An insight, in turn, may be defined as a finding (or more broadly, as useful knowledge) gained through data analytics or, more precisely, through the discovery of patterns and/or relationships amongst an assortment of data/information (e.g., assets). The insight service (106), accordingly, may employ artificial intelligence to ingest assets maintained across various data sources (e.g., one or more internal data sources (104) and/or one or more external data sources (112)) and, subsequently, derive or infer insights therefrom that are supportive of an organization strategy for an organization.

In one or many embodiment(s) disclosed herein, the insight service (106) may be configured with various capabilities or functionalities directed to digitally-assisted organization strategy. Said capabilities/functionalities may include: metadata-based feature expansion for automated machine learning processes, as described in FIG. 3A-3H as well as exemplified in FIGS. 5A-5O, below. Further, the insight service (106) may perform other capabilities/functionalities without departing from the scope disclosed herein.

In one or many embodiment(s) disclosed herein, the insight service (106) may be implemented through on-premises infrastructure, cloud computing infrastructure, or any hybrid infrastructure thereof. The insight service (106), accordingly, may be implemented using one or more network servers (not shown), where each network server may represent a physical or a virtual network server. Additionally, or alternatively, the insight service (106) may be implemented using one or more computing systems each similar to the example computing system shown and described with respect to FIG. 4, below.

In one or many embodiment(s) disclosed herein, a client device (108) may represent any physical appliance or computing system operated by one or more organization users and configured to receive, generate, process, store, and/or transmit data/information (e.g., assets), as well as to provide an environment in which one or more computer programs (e.g., applications, insight agents, etc.) may execute thereon. An organization user, briefly, may refer to any individual whom is affiliated with, and fulfills one or more roles pertaining to, the organization that serves as the proprietor of the organization-internal environment (102). Further, in providing an execution environment for any computer programs, a client device (108) may include and allocate various resources (e.g., computer processors, memory, storage, virtualization, network bandwidth, etc.), as needed, to the computer programs and the tasks (or processes) instantiated thereby. Examples of a client device (108) may include, but are not limited to, a desktop computer, a laptop computer, a tablet computer, a smartphone, or any other computing system similar to the example computing system shown and described with respect to FIG. 4, below. Moreover, any client device (108) is described in further detail through FIG. 1B, below.

In one or many embodiment(s) disclosed herein, the organization-external environment (110) may represent any number of digital (e.g., IT) ecosystems not belonging to, and thus not managed by, an/the organization serving as the proprietor of the organization-internal environment (102). The organization-external environment (110), accordingly, may at least reference any public networks including any respective service(s) and data/information (e.g., assets). Further, the organization-external environment (110) may include one or more external data sources (112) and one or more third-party services (114). Each of these organization-external environment (110) subcomponents may or may not be co-located, and thus reside and/or operate, in the same physical or geographical space. Moreover, each of these organization-external environment (110) subcomponents is described below.

In one or many embodiment(s) disclosed herein, an external data source (112) may represent any data source (described above) not belonging to, and thus not managed by, an/the organization serving as the proprietor of the organization-internal environment (102). Any external data source (112), more specially, may refer to a location that stores at least a portion of the asset(s) found across any public networks. Further, depending on their respective access permissions, entities within the organization-internal environment (102), as well as those throughout the organization-external environment (110), may or may not be permitted to access any external data source (104) and, therefore, may or may not be permitted to access any asset(s) maintained therein.

Moreover, in one or many embodiment(s) disclosed herein, any external data source (112) may be implemented as physical storage (and/or as logical/virtual storage spanning at least a portion of the physical storage). The physical storage may, at least in part, include persistent storage, where examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one or many embodiment(s) disclosed herein, a third party service (114) may represent information technology infrastructure configured for any number of purposes and/or applications. A third party, whom may implement and manage one or more third party services (114), may refer to an individual, a group of individuals, or another organization (i.e., not the organization serving as the proprietor of the organization-internal environment (102)) that serves as the proprietor of said third party service(s) (114). By way of an example, one such third party service (114), as disclosed herein may be exemplified by an automated machine learning (ML) service. A purpose of the automated ML service may be directed to automating the selection, composition, and parameterization of ML models. That is, more simply, the automated ML service may be configured to automatically identify one or more optimal ML algorithms from which one or more ML models may be constructed and fit to a submitted dataset in order to best achieve any given set of tasks. Further, any third party service (114) is not limited to the aforementioned specific example.

In one or many embodiment(s) disclosed herein, any third party service (114) may be implemented through on-premises infrastructure, cloud computing infrastructure, or any hybrid infrastructure thereof. Any third party service (114), accordingly, may be implemented using one or more network servers (not shown), where each network server may represent a physical or a virtual network server. Additionally, or alternatively, any third party service (114) may be implemented using one or more computing systems each similar to the example computing system shown and described with respect to FIG. 4, below.

In one or many embodiment(s) disclosed herein, the above-mentioned system (100) components, and their respective subcomponents, may communicate with one another through a network (not shown) (e.g., a local area network (LAN), a wide area network (WAN) such as the Internet, a mobile network, any other communication network type, or a combination thereof). The network may be implemented using any combination of wired and/or wireless connections. Further, the network may encompass various interconnected, network-enabled subcomponents (or systems) (e.g., switches, routers, gateways, etc.) that may facilitate communications between the above-mentioned system (100) components and their respective subcomponents. Moreover, in communicating with one another, the above-mentioned system (100) components, and their respective subcomponents, may employ any combination of existing wired and/or wireless communication protocols.

While FIG. 1A shows a configuration of components and/or subcomponents, other system (100) configurations may be used without departing from the scope disclosed herein.

Figure 1B:
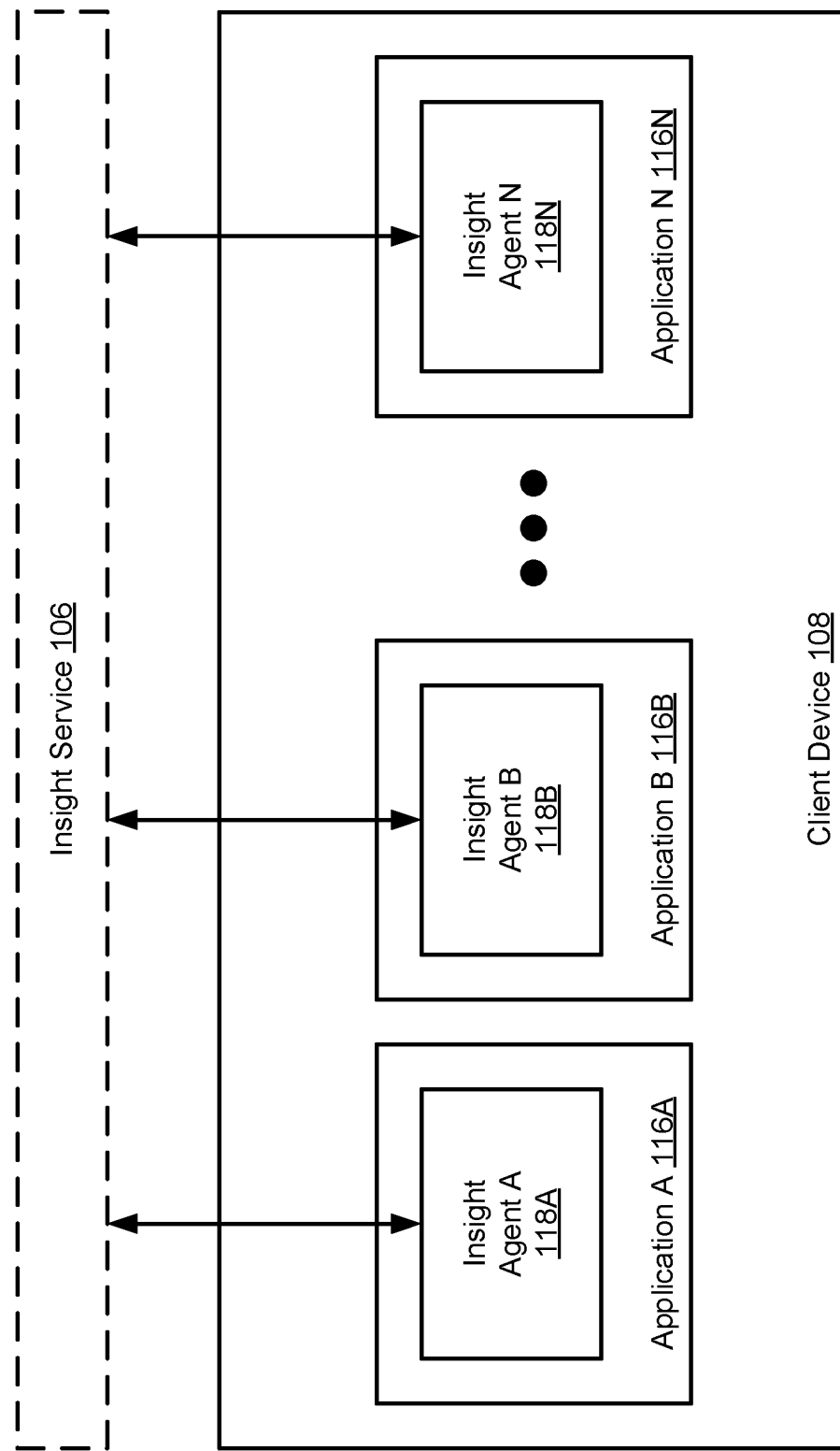
FIG. 1B shows a client device in accordance with one or more embodiments disclosed herein.

FIG. 1B shows a client device in accordance with one or more embodiments disclosed herein. The client device (108) (described above as well) (see e.g., FIG. 1A) may host or include one or more applications (116A-116N). Each application (116A-116N), in turn, may host or include an insight agent (118A-118N). Each of these client device (108) subcomponents is described below.

In one or many embodiment(s) disclosed herein, an application (116A-116N) (also referred to herein as a software application or program) may represent a computer program, or a collection of computer instructions, configured to perform one or more specific functions. Broadly, examples of said specific function(s) may include, but are not limited to, receiving, generating and/or modifying, processing and/or analyzing, storing or deleting, and transmitting data/information (e.g., assets) (or at least portions thereof). That is, said specific function(s) may generally entail one or more interactions with data/information either maintained locally on the client device (108) or remotely across one or more data sources. Examples of an application (116A-116N) may include a word processor, a spreadsheet editor, a presentation editor, a database manager, a graphics renderer, a video editor, an audio editor, a web browser, a collaboration tool or platform, and an electronic mail (or email) client. Any application (116A-116N), further, is not limited to the aforementioned specific examples.

In one or many embodiment(s) disclosed herein, any application (116A-116N) may be employed by one or more organization users, which may be operating the client device (108), to achieve one or more tasks, at least in part, contingent on the specific function(s) that the application (116A-116N) may be configured to perform. Said task(s) may or may not be directed to supporting and/or achieving any short-term and/or long-term goal(s) outlined by an/the organization with which the organization user(s) may be affiliated. In one or many embodiment(s) disclosed herein, an insight agent (118A-118N) may represent a computer program, or a collection of computer instructions, configured to perform any number of tasks in support, or as extensions, of the capabilities or functionalities of the insight service (106) (described above) (see e.g., FIG. 1A). With respect to their assigned application (116A-116N), examples of said tasks, which may be carried out by a given insight agent (118A-118N), may include: detecting an initiation of their assigned application (116A-116N) by the organization user(s) operating the client device (108); monitoring any engagement (or interaction), by the organization user(s), with their assigned application (116A-116N) following the detected initiation thereof; identifying certain engagement/interaction actions, performed by the organization user(s), based on said engagement/interaction monitoring; executing any number of procedures or algorithms, relevant to one or more insight service (106) capabilities/functionalities, in response to one or more of the identified certain engagement/interaction actions; providing periodic and/or on-demand telemetry to the insight service (106), where said telemetry may include, for example, data/information requiring processing or analysis to be performed on/by the insight service (106); and receive periodic and/or on-demand updates (and/or instructions) from the insight service (106). Further, the tasks carried out by any insight agent (118A-118N) are not limited to the aforementioned specific examples.

While FIG. 1B shows a configuration of components and/or subcomponents, other client device (108) configurations may be used without departing from the scope disclosed herein. For example, in one or many embodiment(s) disclosed herein, not all of the application(s) (116A-116N), executing on the client device (108), may host or include an insight agent (118A-118N). That is, in said embodiment(s), an insight agent (118A-118N) may not be assigned to or associated with any of at least a subset of the application(s) (116A-116N) installed on the client device (108).

Figure 2A:
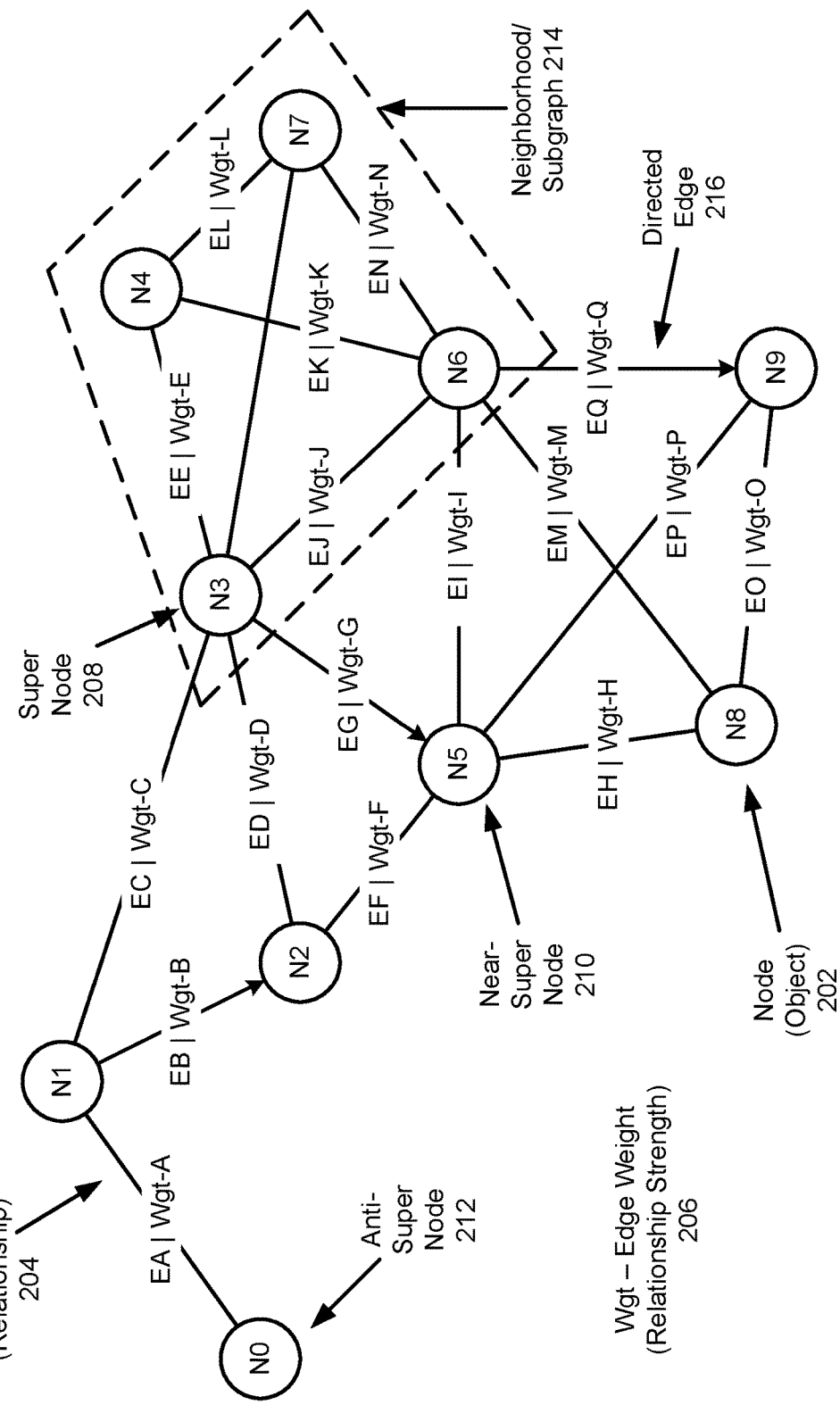
FIG. 2A shows an example connected graph in accordance with one or more embodiments disclosed herein.

FIG. 2A shows an example connected graph in accordance with one or more embodiments disclosed herein. A connected graph (200), as disclosed herein, may refer to a set of nodes (202) (denoted in the example by the circles labeled N0, N1, N2, ..., N9) interconnected by a set of edges (204, 216) (denoted in the example by the lines labeled EA, EB, EC, ..., EQ between pairs of nodes). Each node (202) may represent or correspond to an object (e.g., a catalog entry, a record, specific data/information, a person, etc.) whereas each edge (204, 216), between or connecting any pair of nodes, may represent or correspond to a relationship, or relationships, associating the objects mapped to the pair of nodes. A connected graph (200), accordingly, may reference a data structure that reflects associations amongst any number, or a collection, of objects.

In one or many embodiment(s) disclosed herein, each node (202), in a connected graph (200), may also be referred to herein, and thus may serve, as an endpoint (of a pair of endpoints) of/to at least one edge (204). Further, based on a number of edges connected thereto, any node (202), in a connected graph (200), may be designated or identified as a super node (208), a near-super node (210), or an anti-super node (212). A super node (208) may reference any node where the number of edges, connected thereto, meets or exceeds a (high) threshold number of edges (e.g., six (6) edges). A near-super node (210), meanwhile, may reference any node where the number of edges, connected thereto, meets or exceeds a first (high) threshold number of edges (e.g., five (5) edges) yet lies below a second (higher) threshold number of edges (e.g., six (6) edges), where said second threshold number of edges defines the criterion for designating/identifying a super node (208). Lastly, an anti-super node (212) may reference any node where the number of edges, connected thereto, lies below a (low) threshold number of edges (e.g., two (2) edges).

In one or many embodiment(s) disclosed herein, each edge (204, 216), in a connected graph (200), may either be designated or identified as an undirected edge (204) or, conversely, as a directed edge (216). An undirected edge (204) may reference any edge specifying a bidirectional relationship between objects mapped to the pair of endpoints (i.e., pair of nodes (202)) connected by the edge. A directed edge (216), on the other hand, may reference any edge specifying a unidirectional relationship between objects mapped to the pair of endpoints connected by the edge.

In one or many embodiment(s) disclosed herein, each edge (204, 216), in a connected graph (200), may be associated with or assigned an edge weight (206) (denoted in the example by the labels Wgt-A, Wgt-B, Wgt-C, ..., Wgt-Q). An edge weight (206), of a given edge (204, 216), may reflect a strength of the relationship(s) represented by the given edge (204, 216). Further, any edge weight (206) may be expressed as or through a positive numerical value within a predefined spectrum or range of positive numerical values (e.g., 0.1 to 1.0, 1 to 100, etc.). Moreover, across the said predefined spectrum/range of positive numerical values, higher positive numerical values may reflect stronger relationships, while lower positive numerical values may alternatively reflect weaker relationships.

In one or many embodiment(s) disclosed herein, based on an edge weight (206) associated with or assigned to an edge (204, 216) connected thereto, any node (202), in a connected graph (200), may be designated or identified as a strong adjacent node (not shown) or a weak adjacent node (not shown) with respect to the other endpoint of (i.e., the other node connected to the node (202) through) the edge (204, 216). That is, a strong adjacent node may reference any node of a pair of nodes connected by an edge, where an edge weight of the edge meets or exceeds a (high) edge weight threshold. Alternatively, a weak adjacent node may reference any node of a pair of nodes connected by an edge, where an edge weight of the edge lies below a (low) edge weight threshold.

In one or many embodiment(s) disclosed herein, a connected graph (200) may include one or more subgraphs (214) (also referred to as neighborhoods). A subgraph (214) may refer to a smaller connected graph found within a (larger) connected graph (200). A subgraph (214), accordingly, may include a node subset of the set of nodes (202), and an edge subset of the set of edges (204, 216), that form a connected graph (200), where the edge subset interconnects the node subset.

While FIG. 2A shows a configuration of components and/or subcomponents, other connected graph (200) configurations may be used without departing from the scope disclosed herein.

Figure 2B:
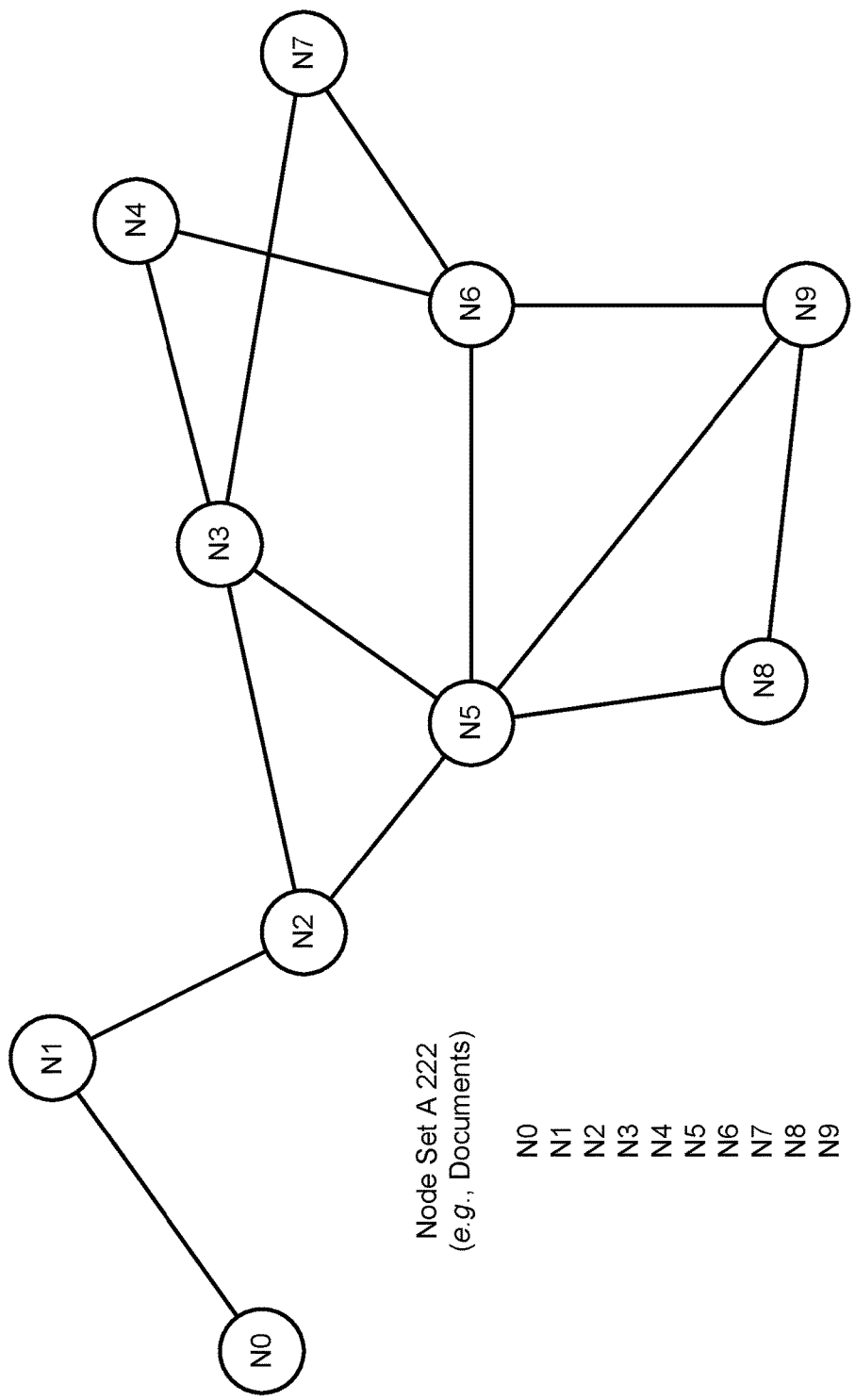
FIGS. 2B-2D show example k-partite connected graphs in accordance with one or more embodiments disclosed herein.
Figure 2C:
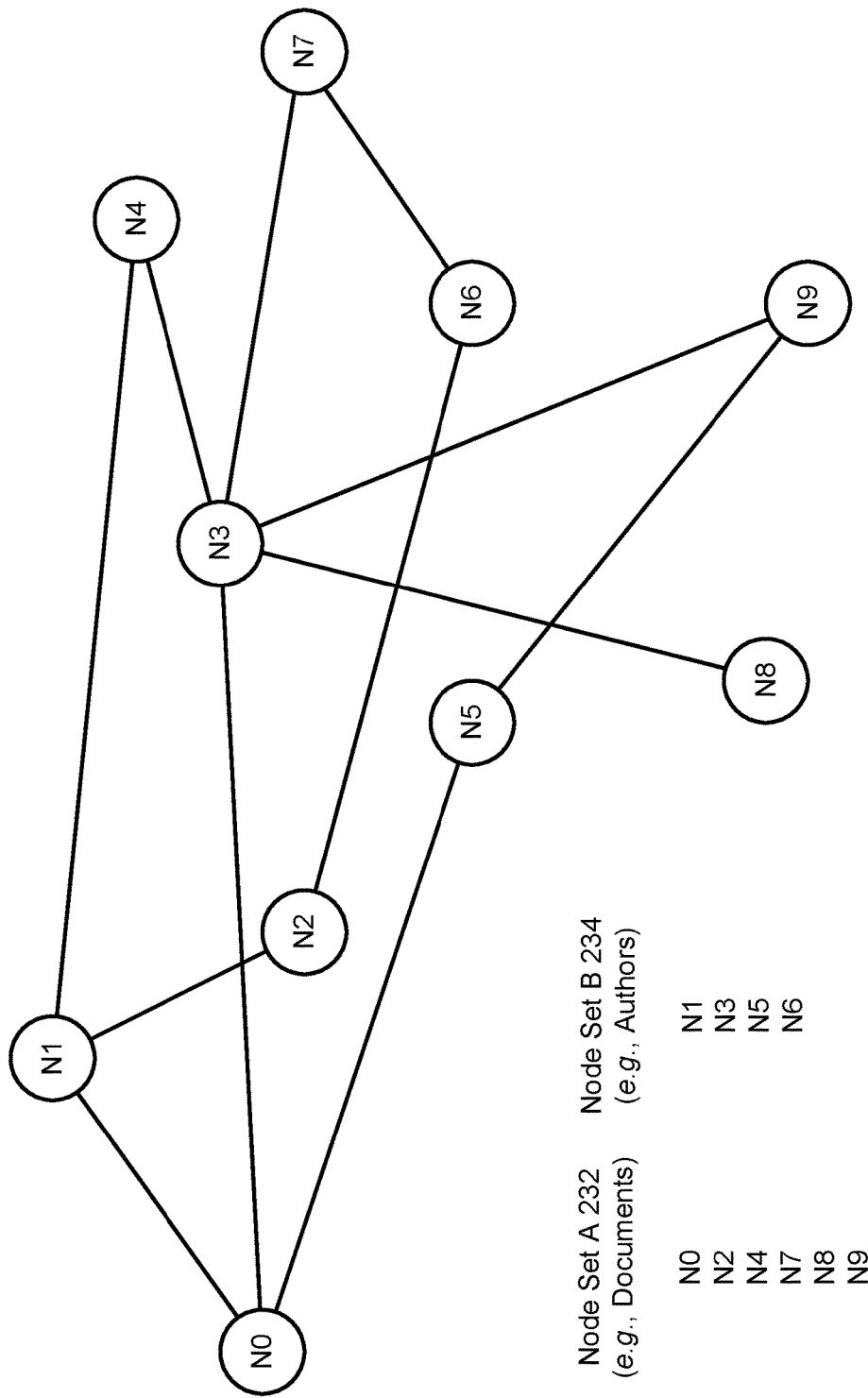
Figure 2D:
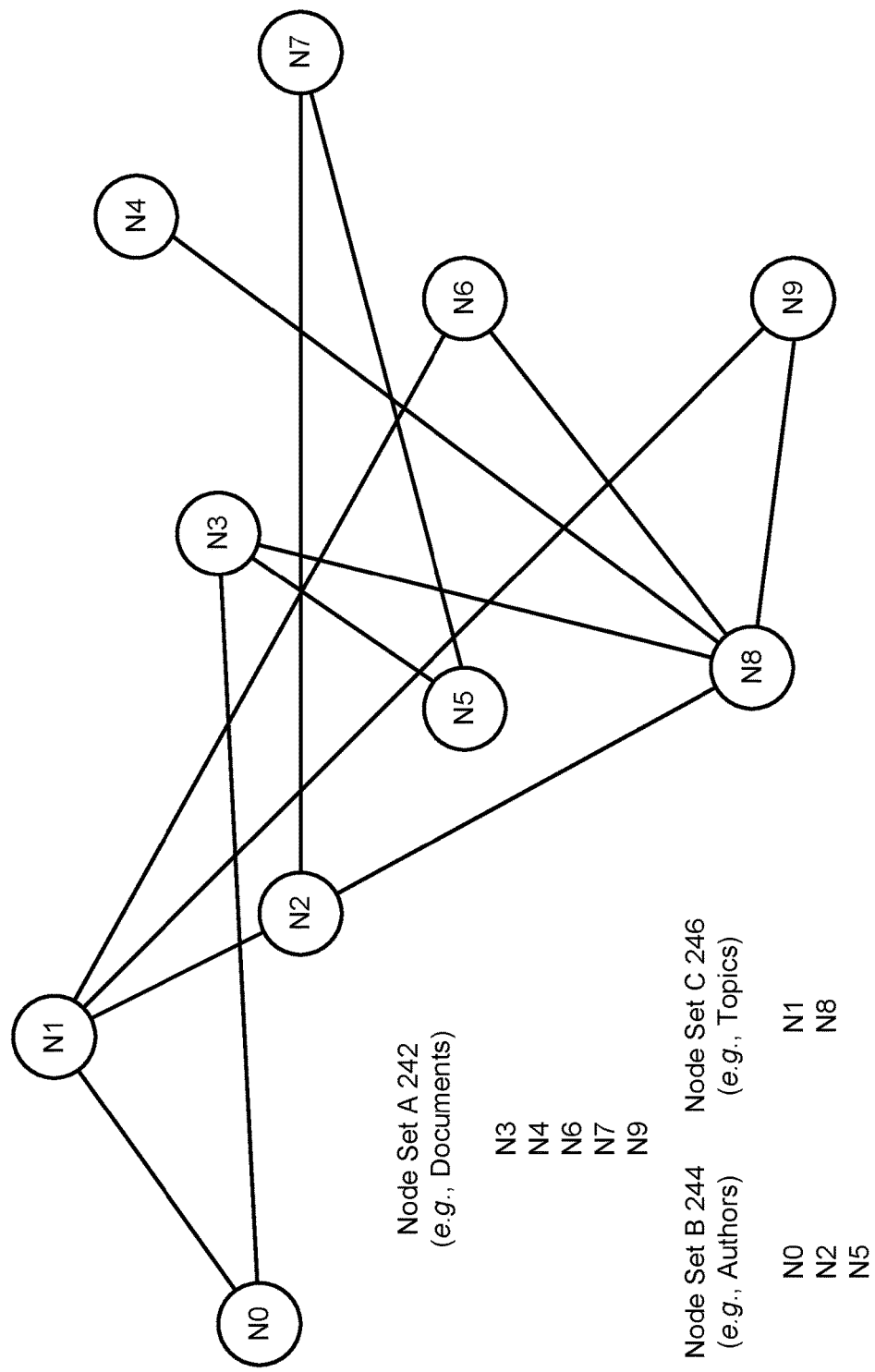

FIGS. 2B-2D show example k-partite connected graphs in accordance with one or more embodiments disclosed herein. Generally, any k-partite connected graph may represent a connected graph (described above) (see e.g., FIG. 2A) that encompasses k independent sets of nodes and a set of edges interconnecting (and thus defining relationships between) pairs of nodes: (a) both belonging to the same, single independent set of nodes in any (k=1)-partite connected graph; or (b) each belonging to a different independent set of nodes in any (k>1)-partite connected graph. Further, any k-partite connected graph, as disclosed herein, may fall into one of three possible classifications: (a) a uni-partite connected graph, where k=1; (b) a bi-partite connected graph, where k=2; or (c) a multi-partite connected graph, where k≥3.

Turning to FIG. 2B, an example uni-partite connected graph (220) is depicted. The uni-partite connected graph (220) includes one (k=1) independent set of nodes—i.e., a node set (222), which collectively maps or belongs to a single object class (e.g., documents).

Further, in the example, the node set is denoted by the circles labeled N0, N1, N2, ..., N9. Each said circle, in the node set (222), subsequently denotes a node that represents or corresponds to a given object (e.g., a document) in a collection of objects (e.g., a group of documents) of the same object class (e.g., documents).

Moreover, the uni-partite connected graph (220) additionally includes a set of edges (denoted in the example by the lines interconnecting pairs of nodes, where the first and second nodes in a given node pair belongs to the node set (222)). Each edge, in the example, thus reflects a relationship, or relationships, between any two nodes of the node set (222) (and, by association, any two objects of the same object class) directly connected via the edge.

Turning to FIG. 2C, an example bi-partite connected graph (230) is depicted. The bi-partite connected graph (230) includes two (k=2) independent sets of nodes—i.e., a first node set (232) and a second node set (234), where the former collectively maps or belongs to a first object class (e.g., documents) whereas the latter collectively maps or belongs to a second object class (e.g., authors).

Further, in the example, the first node set (232) is denoted by the circles labeled N0, N2, N4, N7, N8, and N9, while the second node set (234) is denoted by the circles labeled N1, N3, N5, and N6. Each circle, in the first node set (232), subsequently denotes a node that represents or corresponds to a given first object (e.g., a document) in a collection of first objects (e.g., a group of documents) of the first object class (e.g., documents). Meanwhile, each circle, in the second node set (234), subsequently denotes a node that represents or corresponds to a given second object (e.g., an author) in a collection of second objects (e.g., a group of authors) of the second object class (e.g., authors).

Moreover, the bi-partite connected graph (230) additionally includes a set of edges (denoted in the example by the lines interconnecting pairs of nodes, where a first node in a given node pair belongs to the first node set (232) and a second node in the given node pair belongs to the second node set (234)). Each edge, in the example, thus reflects a relationship, or relationships, between any one node of the first node set (232) and any one node of the second node set (234) (and, by association, any one object of the first object class and any one object of the second object class) directly connected via the edge.

Turning to FIG. 2D, an example multi-partite connected graph (240) is depicted. The multi-partite connected graph (240) includes three (k=3) independent sets of nodes—i.e., a first node set (242), a second node set (244), and a third node set (246). The first node set (242) collectively maps or belongs to a first object class (e.g., documents); the second node set (244) collectively maps or belongs to a second object class (e.g., authors); and the third node set (246) collectively maps or belongs to a third object class (e.g., topics).

Further, in the example, the first node set (242) is denoted by the circles labeled N3, N4, N6, N7, and N9; the second node set (244) is denoted by the circles labeled N0, N2, and N5; and the third node set (246) is denoted by the circles labeled N1 and N8. Each circle, in the first node set (242), subsequently denotes a node that represents or corresponds to a given first object (e.g., a document) in a collection of first objects (e.g., a group of documents) of the first object class (e.g., documents). Meanwhile, each circle, in the second node set (244), subsequently denotes a node that represents or corresponds to a given second object (e.g., an author) in a collection of second objects (e.g., a group of authors) of the second object class (e.g., authors). Lastly, each circle, in the third node set (246), subsequently denotes a node that represents or corresponds to a given third object (e.g., a topic) in a collection of third objects (e.g., a group of topics) of the third object class (e.g., topics).

Moreover, the multi-partite connected graph (240) additionally includes a set of edges (denoted in the example by the lines interconnecting pairs of nodes, where a first node in a given node pair belongs to one object class from the three available object classes, and a second node in the given node pair belongs to another object class from the two remaining object classes (that excludes the one object class to which the first node in the given node pair belongs)). Each edge, in the example, thus reflects a relationship, or relationships, between any one node of one object class (from the three available object classes) and any one node of another object class (from the two remaining object class excluding the one object class) directly connected via the edge.

FIGS. 3A-3H show flowcharts describing a method for metadata-based feature expansion for automated machine learning processes in accordance with one or more embodiments disclosed herein. The various steps outlined below may be performed by an insight service (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Figure 3A:
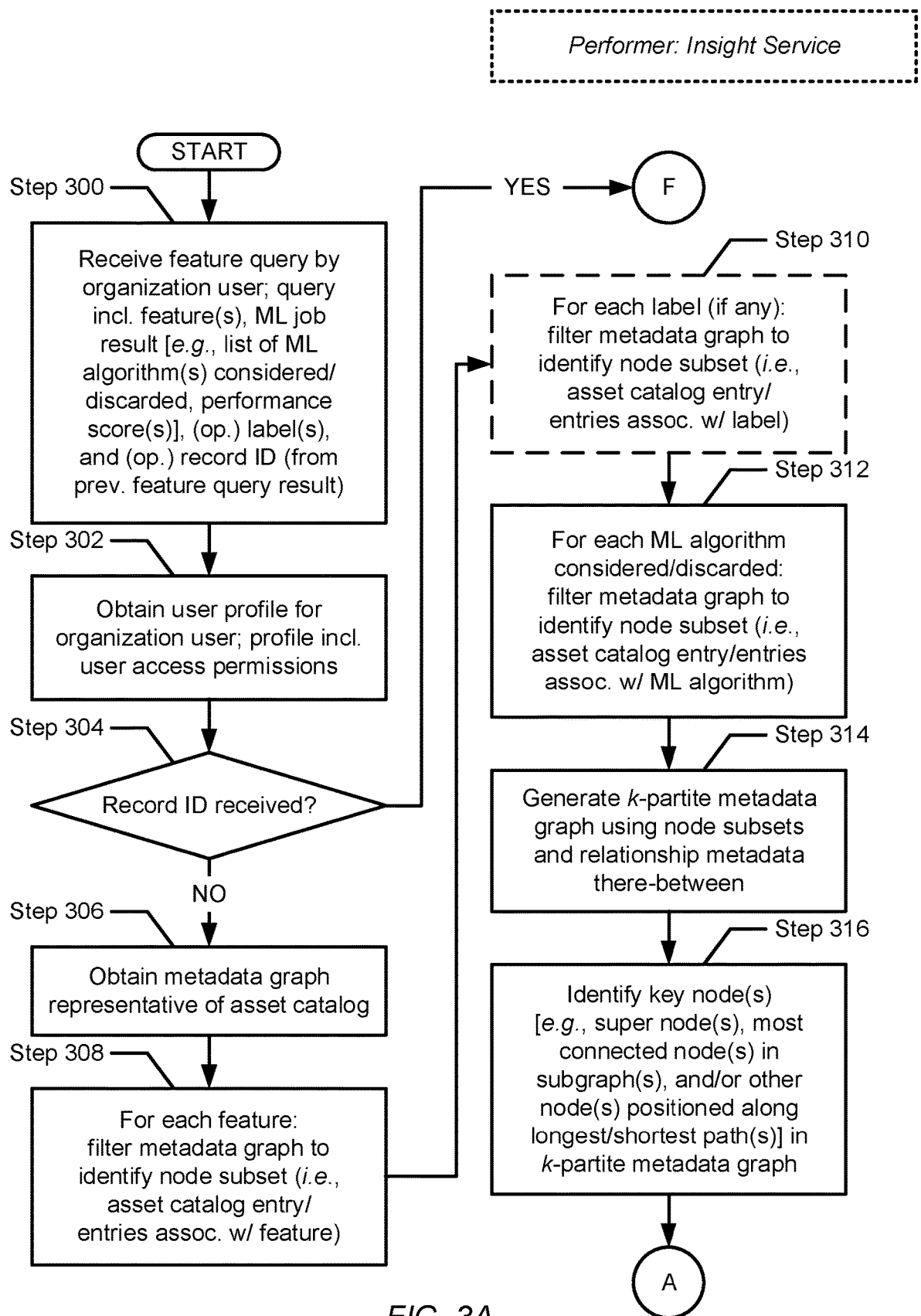
FIGS. 3A-3H show flowcharts describing a method for metadata-based feature expansion for automated machine learning processes in accordance with one or more embodiments disclosed herein.

Turning to FIG. 3A, in Step 300, a feature query is received. In one or many embodiment(s) disclosed herein, the feature query may include or specify a set of features and a machine learning (ML) job result. Optionally, the feature query may further include or specify one or more labels and/or a record identifier (ID). Each of these feature query enclosures is described below. Further, the feature query may have been submitted by an organization user. As such, the feature query may represent an inquiry, by the organization user, with regards to the selection or suggestion of one or more supplemental features, which should (however may or may not) enhance a performance of one or more ML models (described below) being evaluated by the organization user.

In one or many embodiment(s) disclosed herein, the set of features may refer to a collection of one or more features. Each feature may represent an independent facet (e.g., a property, a factor, or a variable) reflected in the input data to one or more ML models, where each feature, further, may be considered pertinent to obtaining or identifying an accurate prediction output, classification output, or other form of data analysis output (depending on the architecture of the ML model) that typically results from the processing of said input data by the ML model(s). Any ML model, in turn, may generally refer to an analytical model (i.e., representing a real-world process for addressing a real-world problem) through which 'learning' transpires by way of data being leveraged to improve the performance of one or more tasks. Moreover, an architecture (e.g., including optimized parameters and hyper-parameters) of any ML model may derive from the ML algorithm (described below) on which the ML model is based. Accordingly, a ML algorithm may be perceived as a default template of a learning process attempting to perform a set of tasks, whereas the ML model represents a trained, tested, and/or otherwise, optimized, version of the ML algorithm on which the ML model is based.

In one or many embodiment(s) disclosed herein, an entirety of the set of features may reflect original feature(s) considered or selected by the organization user. In such embodiment(s), the received feature query may represent an original feature query directed to one or more new ML models being evaluated by the organization user. Alternatively, in one or many other embodiment(s) disclosed herein, a subset of the set of features may reflect original feature(s) considered or selected by the organization user, while a remaining subset of the set of features may reflect supplemental feature(s) previously selected or suggested by the insight service. Further, in the(se) other embodiment(s), the received feature query may represent a successive feature query directed to one or more existing ML models being re-evaluated by the organization user.

In one or many embodiment(s) disclosed herein, the ML job result may refer to a collection of information provided by an automated ML service following processing thereby of a submitted ML job (usually by the organization user). The automated ML service may refer to a third-party service directed to automating the selection, composition, and parameterization of ML models. That is, more simply, the automated ML service may automatically identify one or more optimal machine learning algorithms from which one or more ML models may be constructed and fit to a submitted dataset in order to best achieve any given set of tasks. A ML job may generally refer to a request to perform a desired functionality of the automated ML service, the desired functionality being, for example, producing the ML job result based on one or more input arguments submitted thereto and enclosed with the ML job. The ML job result, meanwhile, may at least include: a list of ML algorithms; and one or more sets of performance scores.

In one or many embodiment(s) disclosed herein, the list of ML algorithms may refer to any number of ML algorithms, at the disposal of the automated ML service, from which one or more of said algorithms may be identified, through training and validation, as a best-fit to the argument(s) (e.g., an input matrix and a label vector (described below)) defining a given submitted ML job. Each listed ML algorithm may be designated as either a considered ML algorithm or a discarded ML algorithm in view of the given submitted ML job. A considered ML algorithm may refer to a ML algorithm that can be applied (or can execute) given the argument(s) of the given submitted ML job, whereas a discarded ML algorithm may alternatively refer to a ML algorithm that cannot be applied (or cannot execute) given the argument(s) of the given submitted ML job. Lastly, any ML algorithm may generally refer to an artificial intelligence driven procedure employed to discern patterns with data and, subsequently, learn from said data. Examples of a ML algorithm may include, but are not limited to: regression (e.g., linear, logistic, etc.); neural networks (e.g., recurrent, convoluted, etc.); decision trees or random forests; support vector machines; k-means or kNN clustering; Markov decision processes; Naïve Bayes classifiers; classification and regression trees (CART); Apriori analyzers; principal component analysis (PCA); and ensemble classifiers (e.g., bagging, boosting, stacking, etc.). Moreover, any ML algorithm is not limited to the aforementioned specific examples.

In one or many embodiment(s) disclosed herein, a performance score (or metric) may refer to a measurement for evaluating ML model performance. Any given performance score may measure performance relatable to the form of data analysis (e.g., regression, classification, ranking, computer vision, natural language processing, deep learning, etc.) being performed by the given ML model being evaluated. Further, a performance score may be used throughout training and/or testing phase(s) of the building of a given ML model in order to guide a betterment of the given ML model in the achievement of its assigned task(s). Examples of a performance score may include, but are not limited to: for classification data analysis—accuracy, precision, recall, F1-score, sensitivity, specificity, receiver operating characteristic (ROC) curve, area under the curve (AUC), etc.; for regression data analysis—mean squared error (MSE), mean absolute error (MAE), inlier ratio, root mean squared error (RMSE), $R^2$ (R-squared coefficient), etc.; for ranking data analysis—mean reciprocal rank (MRR), mean average precision (MAP), hit ratio, normalized discounted cumulative gain (NDCG), etc.; for computer vision data analysis—peak noise-to-signal ratio (PSNR), structured similarity indexing method (SSIM), feature similarity indexing method (FSIM), etc.; for natural language processing data analysis—perplexity, bilingual evaluation understudy (BLEU) score, etc.; and for deep learning data analysis—inception score, Frechet inception distance, etc. Further, a performance is not limited to the aforementioned specific examples.

In one or many embodiment(s) disclosed herein, and by way of an example, the process through which the automated ML service may produce a given ML job result from a given ML job may include, but is not limited to: (a) receiving the given ML job at least specifying an input matrix and a label vector, where the input matrix represents a S×F dataset (S for samples and/for features) that specifies the input data for ML model training and testing purposes, and where the label vector represents a 1×S (S for samples) array that specifies a desired/target output (e.g., continuous/numerical or categorical) for each data sample reflected in the input matrix; (b) selecting one or more ML algorithms (i.e., considered ML algorithm(s) (described above)) (from a pool of available ML algorithms) that can handle the input matrix as input(s) and, subsequently, can produce output(s) that can be assessed against the label vector; (c) building one or more ML models based, respectively, on the one or more selected ML algorithms; (d) training the one or more built ML models, using at least a portion of the input matrix and a corresponding at least portion of the label vector, to obtain one or more trained ML models; (e) testing the one or more trained ML models, using at least a remaining portion of the input matrix and a corresponding remaining portion of the label vector, to obtain one or more tested ML models and a set of performance scores quantifying a performance of each tested ML model; and (f) producing the given ML job result to at least include a list of ML algorithms specifying the selected (i.e., considered) ML algorithm(s) and non-selected (i.e., discarded) ML algorithm(s), reason(s) explaining the selection and/or non-selection of certain ML algorithm(s), and one or more sets of performance scores respectively for the one or more tested ML models. The above-described process, undertaken by the automated ML service, is only for explanatory purposes only and not intended to limit the scope disclosed herein.

In one or many embodiment(s) disclosed herein, a label (if any had been received) may refer to a desired or target output, respective to a given data sample of a dataset, to which an output of any given ML model should strive to match. Further, a nature or data type of any given label may be contingent on the form of data analysis being performed by the given ML model. For example, a label for a regression driven ML model may be reflective of a numerical value or a range of numerical values. By way of another example, a label for a classification driven ML model may be reflective of a categorical (e.g., text) value. Moreover, a label is not limited to the aforementioned specific examples.

In one or many embodiment(s) disclosed herein, the record ID (if any had been received) may refer to a character string that uniquely identifies a given query record (described below). Said character string may be of any arbitrary size/length and may be expressed, for example, as a concatenation of one or more of any subset or all of the character types: an alphabetic letter, a whole number, and a non-alphanumeric symbol.

In Step 302, a user profile is obtained. In one or many embodiment(s) disclosed herein, the user profile may pertain to the organization user (from which the feature query had been received in Step 300). The user profile may refer to a collection of settings and information associated with the organization user. As such, the user profile may include, but is not limited to, user access permissions.

In one or many embodiment(s) disclosed herein, the user access permissions may reflect the level of authorization granted to the organization user for accessing specific resources. The granted level of authorization, for any given organization user, may, for example, be contingent on any number of factors, which may include, but is/are not limited to: one or more user organization roles (e.g., title(s) and/or position(s)) within an organization that may be associated with the given organization user; one or more organization responsibilities (e.g., assigned project(s) or task(s)) within an organization that may be associated with the given organization user; a client device (and the security hygiene or characteristics thereof) operated by the given organization user; and a geographical location where the given organization user may be physically situated. The factor(s) affecting the user access permissions for any given organization user is/are not limited to the aforementioned specific examples.

In Step 304, a determination is made as to whether a record ID had been received via the feature query (in Step 300). In one or many embodiment(s) disclosed herein, if it is determined that the feature query excluded a record ID, then the method proceeds to Step 306. On the other hand, in one or many other embodiment(s) disclosed herein, if it is alternatively determined that the feature query included a record ID, then the method alternatively proceeds to Step 362 (see e.g., FIG. 3E).

In Step 306, following the determination (made in Step 304) that a record ID had not been received via the feature query (in Step 300), a metadata graph is obtained. In one or many embodiment(s) disclosed herein, the metadata graph may refer to a connected graph (see e.g., FIG. 2A) representative of an asset catalog. To that end, the metadata graph may include a set of nodes interconnected by a set of edges, where the set of nodes are representative of asset catalog entries and the set of edges are representative of connections or relationships there-between. Further, each node may pertain to a given asset (e.g., any dataset or other structured/tabular form of information), where the representative asset catalog entry thereof may store metadata for, or information descriptive of, the given asset.

Examples of said asset metadata may include, but is not limited to: a brief description of the asset; stewardship (or ownership) information (e.g., individual or group name(s), contact information, etc.) pertaining to the steward(s)/owner(s) of the asset; a version character string reflective of a version or state of the asset at/for a given point-in-time; one or more categories, topics, and/or aspects associated with the asset; an asset identifier uniquely identifying the asset; one or more tags, keywords, or terms further describing the asset; a source identifier and/or location associated with an internal or external data source (see e.g., FIG. 1) where the asset resides or is maintained; and compliance information specifying laws, regulations, and standards surrounding the asset, as well as policies directed to data governance (e.g., availability, usability, integrity, and security) pertinent to the asset. The asset metadata for any asset is not limited to the aforementioned specific examples.

In one or many embodiment(s) disclosed herein, the asset metadata may reflect other information especially descriptive of any given asset being of the form of a dataset (or any other structured/tabular form of information). Examples of said dataset-specific asset metadata may include, but is not limited to: a set of dataset features (e.g., properties, factors, or variables) reflected in the given dataset; a set of dataset labels (e.g., desired/target outputs) mapped to samples of the given dataset; and one or more dataset ML algorithms that can be appropriately applied to (or that is configured to appropriately consume) the given dataset. Further, said dataset-specific asset metadata is not limited to the aforementioned specific examples.

In Step 308, for each feature in the feature(s) (received via the feature query in Step 300), the metadata graph (obtained in Step 306) is filtered based on the feature. In one or many embodiment(s) disclosed herein, filtering of the metadata graph may, for example, entail topic matching (e.g., case-insensitive word or phrase matching) and/or semantic similarity calculation between the feature and the asset metadata (e.g., the dataset feature(s)) for assets catalogued in the asset catalog entries of which nodes of the metadata graph are representative. Further, for each feature, filtering of the metadata graph based thereon may result in the identification of a node subset of the set of nodes forming the metadata graph. The identified node subset, subsequently, may include one or more nodes representative of one or more assets, respectively, that may be associated with the feature.

In Step 310, additionally, or optionally, for each label of the labels(s) (if any) (received via the feature query in Step 300), the metadata graph (obtained in Step 306) is filtered based on the label. In one or many embodiment(s) disclosed herein, filtering of the metadata graph may, for example, entail topic matching (e.g., case-insensitive word or phrase matching) and/or semantic similarity calculation between the label and the asset metadata (e.g., the dataset label(s)) for assets catalogued in the asset catalog entries of which nodes of the metadata graph are representative. Further, for each label, the filtering of the metadata graph based thereon may result in the identification of a node subset of the set of nodes forming the metadata graph. The identified node subset, subsequently, may include one or more nodes representative of one or more assets, respectively, that may be associated with the label.

In Step 312, additionally, or optionally, for each ML algorithm of the ML algorithm(s) (received as part of the ML job results via the feature query in Step 300), the metadata graph (obtained in Step 306) is filtered based on the ML algorithm. In one or many embodiment(s) disclosed herein, filtering of the metadata graph may, for example, entail topic matching (e.g., case-insensitive word or phrase matching) and/or semantic similarity calculation between the ML algorithm and the asset metadata (e.g., the dataset ML algorithm(s)) for assets catalogued in the asset catalog entries of which nodes of the metadata graph are representative. Further, for each ML algorithm, the filtering of the metadata graph based thereon may result in the identification of a node subset of the set of nodes forming the metadata graph. The identified node subset, subsequently, may include one or more nodes representative of one or more assets, respectively, that may be associated with the ML algorithm.

In Step 314, a k-partite metadata graph is generated using the node subset(s) (identified in Step(s) 708, 710, and/or 712). In one or many embodiment(s) disclosed herein, the k-partite metadata graph (see e.g., FIGS. 2B-2D) may reflect a new representation of, which may be based on one or more particular perspectives on, the metadata graph (obtained in Step 306). The k-partite metadata graph, further, may reflect a connected graph that encompasses k independent sets of nodes (i.e., the node subset(s), where k equals the number or cardinality of node subset(s)) and a set of edges interconnecting (and thus defining relationships between) pairs of nodes each belonging to a different independent set of nodes (or node subset)—with the exception of uni- (k=1) partite metadata graphs (see e.g., FIG. 2B) where the set of edges interconnect nodes of the single independent set of nodes (or single node subset) forming the uni-partite metadata graphs.

In Step 316, one or more key nodes, in/of the k-partite metadata graph (generated in Step 314), is/are identified. In one or many embodiment(s) disclosed herein, any key node of the identified key node(s) may be exemplified by a super node. A super node may refer to a densely connected node or a node with a disproportionately high number of edges connected thereto. Additionally, or alternatively, a super node may be identified as any node representing a most connected node (e.g., any node that serves as an endpoint of a pair of endpoints to a highest number of edges) in the k-partite metadata graph, which may otherwise be defined as any node that serves as an endpoint of a pair of endpoints to a number of edges, where the number of edges meets or exceeds a threshold number of edges (that may be dynamically set). For example, the threshold number of edges may be set to ten edges, where any node(s) in the k-partite metadata graph that serves as an endpoint (of a pair of endpoints) to at least ten edges may be classified or labeled as a super node in/of the k-partite metadata graph.

Alternatively, in one or many embodiment(s) disclosed herein, any key node of the identified key node(s) may be exemplified by a most connected node within a metadata subgraph in/of the k-partite metadata graph (generated in Step 314). A metadata subgraph may generally refer to a connected graph that may be found within, and therefore may include at least a portion of the elements (e.g., a set of nodes interconnected by a set of edges) forming, a larger connected graph (e.g., the k-partite metadata graph). A most connected node within any metadata subgraph, accordingly, may be defined as any node found within the metadata subgraph that serves as an endpoint of a pair of endpoints to a second number of edges, where the second number of edges meets or exceeds a second threshold of edges (that may be dynamically set). For example, the second threshold of edges may be set to ten edges, where any node(s) found within any given metadata subgraph(s), in the k-partite metadata graph, that serves as an endpoint (of a pair of endpoints) to at least ten edges may be classified or labeled as a most connected node in/of the given metadata subgraph.

Alternatively, in one or many embodiment(s) disclosed herein, any key node of the identified key node(s) may be exemplified by another node, which may be found in the k-partite metadata graph (generated in Step 314) that satisfies one or more other identification criteria. Examples of said other identification criteria may include, but is not limited to: whether a node is positioned along a longest path traversing the k-partite metadata graph; and whether a node is positioned along a shortest path traversing the k-partite metadata graph.

Figure 3B:
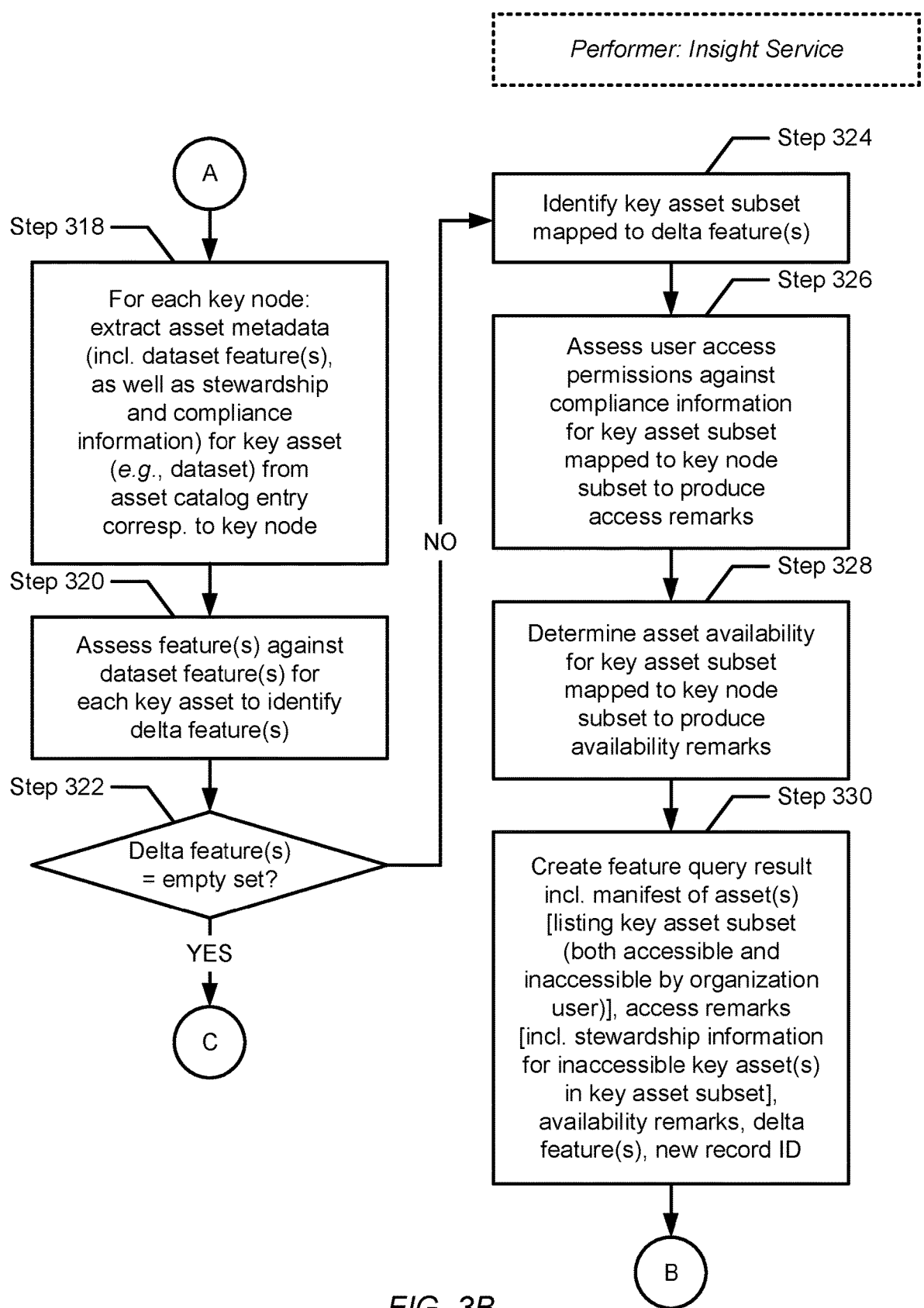

Turning to FIG. 3B, in Step 318, for each key node of the key node(s) (identified in Step 316), at least a portion of asset metadata, for a key asset (e.g., any dataset or other structured/tabular form of information) corresponding to the key node, is extracted. In one or many embodiment(s) disclosed herein, the extracted portion of asset metadata may include, but is not limited to, one or more dataset features, stewardship (or ownership) information, and compliance information (all briefly defined above—see e.g., Step 306) associated with the key asset.

In Step 320, the feature(s) (received via the feature query in Step 300) is/are assessed against the dataset feature(s) (extracted in Step 318) for each key asset corresponding respectively to each key node of the key node(s) (identified in Step 316). In one or many embodiment(s) disclosed herein, the assessment may, for example, entail word/phrase matching and/or semantic similarity calculation between each feature of the feature(s) and each dataset feature of the dataset feature(s) for each key asset. Further, the assessment may result in the identification of zero or more delta features. A delta feature (if any) may refer to any non-duplicative (or unique) dataset feature found to be excluded or distinct from any feature of the feature(s). Accordingly, any identified delta feature(s) may represent a supplemental property, factor, or variable that could boost the performance of the ML model(s) being evaluated by the organization user.

In Step 322, a determination is made as to whether the delta feature(s) (if any) (identified in Step 320) reflect(s) an empty set (i.e., a cardinality thereof equals zero). In one or many embodiment(s) disclosed herein, if it is determined that the delta feature(s) (if any) reflect(s) a non-empty set (i.e., a cardinality thereof exceeds zero), then the method proceeds to Step 324. On the other hand, in one or many other embodiment(s) disclosed herein, if it is alternatively determined that the delta feature(s) (if any) reflect(s) an empty set, then the method alternatively proceeds to Step 336 (see e.g., FIG. 3C).

In Step 324, following the determination (made in Step 322) that the delta feature(s) (if any) (identified in Step 320) reflect(s) a non-empty set (i.e., a cardinality thereof exceeds zero), a key asset subset is identified. In one or many embodiment(s) disclosed herein, the key asset subset may refer to one or more key assets representative of at least a portion of the key asset(s) (e.g., each a dataset or any other structured/tabular form of information) corresponding respectively to the key node(s) (identified in Step 316). Further, one or more delta features of the delta feature(s) (identified in Step 320) may map to a separate key asset in the key asset subset. For example, Delta Features 1 & 2 may map to Key Asset 1, Delta Feature 3 may map to Key Asset 2, and Delta Features 4-6 may map to Key Asset 3.

In Step 326, the user access permissions (obtained in Step 302), associated with the organization user, is assessed against the compliance information (extracted in Step 318) associated with one or more key assets. In one or many embodiment(s) disclosed herein, the key asset(s) may pertain to the key asset subset (identified in Step 324) and may map to asset catalog entry/entries represented by a key node subset of the key node(s) (identified in Step 316).

Further, assessment of the user access permissions, against the asset compliance information, may, for example, entail determining: whether a geographical location of the organization user is within the geographical restrictions or boundaries, at least in part, defining access to a key asset; whether the organization, with which the organization user is associated, is of a particular type (e.g., a commercial business, an educational institution, etc.) to which access and usability of a key asset is granted; and whether one or more organization roles (e.g., title(s) and/or position(s)) and/or professional affiliation(s) (e.g., membership(s) to professional organization(s)), with which the organization user is associated, satisfies criteria for permitting access to a key asset.

Moreover, the above-mentioned assessment, between the user access permissions and the asset compliance information, may result in producing access remarks that concern the key asset(s), of the key asset subset, associated with the extracted compliance information. In one or many embodiment(s) disclosed herein, any access remarks may refer to information expressing whether the key asset(s) is/are accessible or inaccessible to/by the organization user. Said information (for any given key asset of the key asset subset) may include, but is not limited to: an accessibility statement indicating that the given key asset can or cannot be accessed by the organization user; one or more reasons explaining or supporting the accessibility statement; a digital reference link (e.g., uniform resource locator or hyperlink) or an access protocol through which the organization user can access the given key asset should the accessibility statement indicate that the given key asset can be accessed by the organization user; and/or the stewardship information (extracted in Step 318) associated with the given key asset should the accessibility statement alternatively indicate that the given key asset cannot be accessed by the organization user.

In one or many embodiment(s) disclosed herein, stewardship information may be integrated, as part of the access remarks for a given key asset of the key asset subset (if applicable—e.g., if the given key asset is deemed inaccessible), in order to provide the organization user with an opportunity to potentially gain access to the given key asset through communications with the steward(s) or owner(s) of the given key asset. The potential to gain access to the given key asset through this avenue, however, may be moot or disregarded in view of other, higher-tiered compliance policies such as those outlined by geographical restrictions, as well as national and/or international laws, regulations, and standards.

In Step 328, an asset availability, for each of one or more key assets (e.g., one or more datasets or any other structured/tabular forms of information) of the key asset subset (identified in Step 324), is determined. In one or many embodiment(s) disclosed herein, the key asset(s) may map to asset catalog entry/entries represented by a key node subset of the key node(s) (identified in Step 316). Further, the determination of asset availability for any given key asset may, for example, entail the submission of an asset availability query to an appropriate (i.e., internal or external) data source identified in the asset metadata describing the given key asset. Any asset availability query may include or specify an asset identifier (also found in the asset metadata) that uniquely identifies the given key asset. Moreover, in response to any asset availability query, a corresponding asset availability reply may be received, which may include or specify an asset availability state indicating whether the given key asset is available (e.g., obtainable, usable, or reachable) or unavailable (e.g., unobtainable, unusable, or unreachable). Thereafter, the returned asset availability state(s) for the key asset(s), respectively, may be used to produce availability remarks concerning the key asset(s). Any availability remarks may refer to information expressing whether the key asset(s) is/are available or unavailable at/on one or more data sources that the key asset(s) currently reside, or at one time, had resided.

In Step 330, a feature query result is created. In one or many embodiment(s) disclosed herein, the feature query result may include: a manifest of asset(s) listing each of the key asset(s) of the key asset subset (identified in Step 324); the access remarks (produced in Step 326); the availability remarks (produced in Step 328); the delta feature(s) (identified in Step 320); and a new record identifier (ID) representing, for example, a character string that uniquely identifies a query record (described below—see e.g., Step 334).

Examples of said tracked query-pertinent information (also referred to herein as tracked query state) may include, but is not limited to: the feature(s) and the ML job result (received via the feature query in Step 300); the label(s) (if any) (optionally received via the feature query in Step 300); the k-partite metadata graph (generated in Step 314); the key node(s) (identified in Step 316); the delta feature(s) (identified in Step 320); and the new record ID.

Figure 3C:
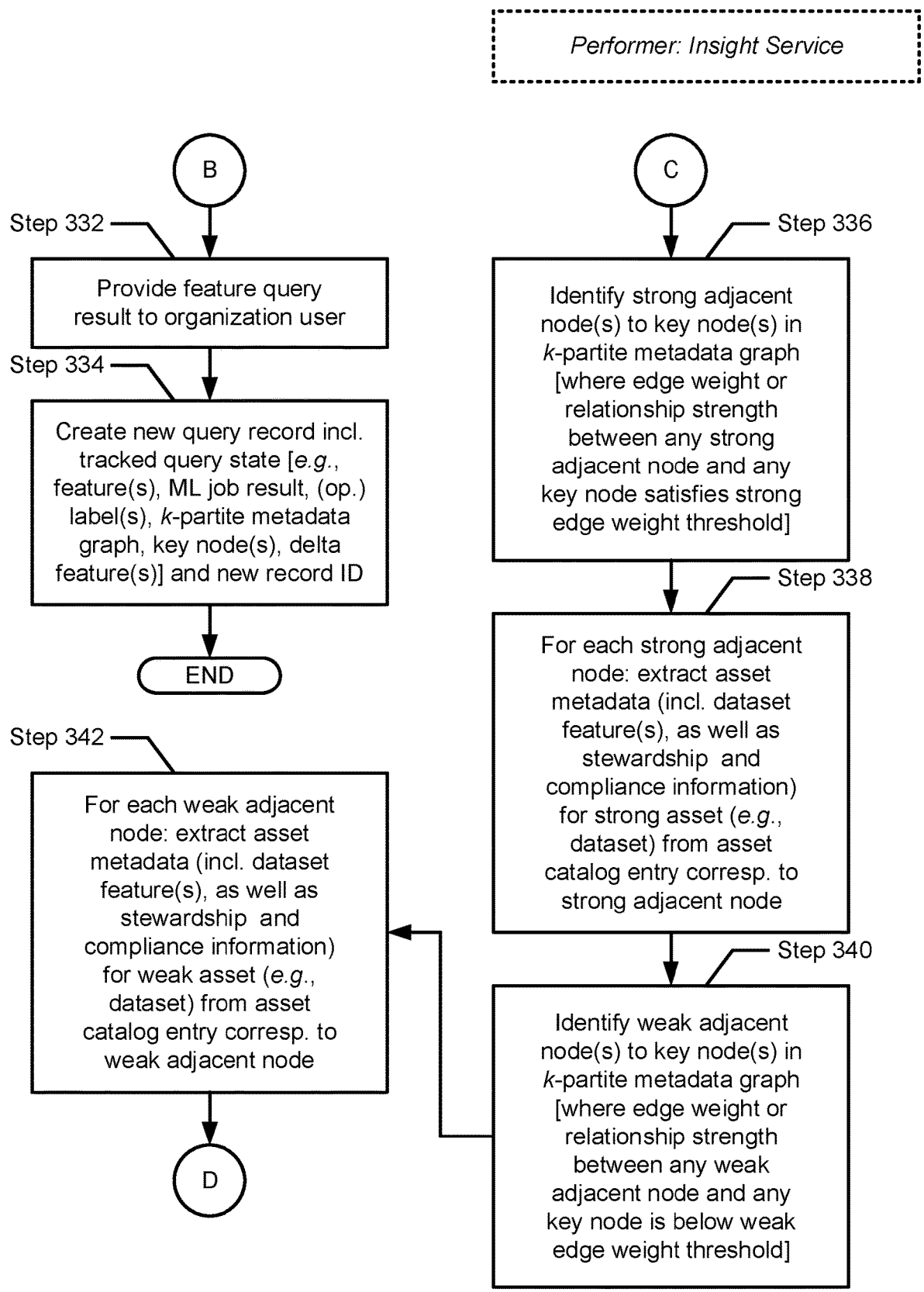

Turning to FIG. 3C, in Step 332, the feature query result (created in Step 330) is provided in response to the feature query (received in Step 300). Particularly, in one or many embodiment(s) disclosed herein, the feature query result may be provided to the organization user who had submitted the feature query.

In Step 334, a new query record is created. In one or many embodiment(s) disclosed herein, the new query record may refer to a data directory, or a data container, in which the above-mentioned tracked query state may be maintained. The new query record, further, may be identified using the new record ID (mentioned in Step 330) and, accordingly, may be associated with the feature query (received in Step 300).

In Step 336, following the alternate determination (made in Step 322) that the delta feature(s) (if any) (identified in Step 320) reflect(s) an empty set (i.e., a cardinality thereof equals zero), and for each key node of the key node(s) (identified in Step 316), one or more strong adjacent nodes, in/of the k-partite metadata graph (generated in Step 314), is/are identified. In one or many embodiment(s) disclosed herein, with respect to a given key node, a strong adjacent node linked to the given key node may refer to a node connected thereto via an edge representative of a strong relationship there-between. Quantification of said strong relationship may, for example, entail an edge weight assigned to the edge interconnecting the given key node and the strong adjacent node, where the edge weight (e.g., expressed as a numerical value) meets or exceeds an edge weight threshold. The edge weight threshold, in turn, may be dynamically set and may denote the criterion for determining whether the associated edge is reflective of a strong relationship between a pair of assets (e.g., a pair of separate datasets or any other structured/tabular forms of information) corresponding to the given key node and a strong adjacent node.

In Step 338, for each strong adjacent node of the strong adjacent node(s) (identified in Step 336), at least a portion of asset metadata, for a strong asset (e.g., any dataset or other structured/tabular form of information) corresponding to the strong adjacent node, is extracted. In one or many embodiment(s) disclosed herein, the extracted portion of asset metadata may include, but is not limited to, one or more dataset features, stewardship (or ownership) information, and compliance information (all briefly defined above—see e.g., Step 306) associated with the strong asset.

Additionally, or alternatively, in Step 340, for each key node of the key node(s) (identified in Step 316), one or more weak adjacent nodes, in/of the k-partite metadata graph (generated in Step 314), is/are identified. In one or many embodiment(s) disclosed herein, with respect to a given key node, a weak adjacent node linked to the given key node may refer to a node connected thereto via an edge representative of a weak relationship there-between. Quantification of said weak relationship may, for example, entail an edge weight assigned to the edge interconnecting the given key node and the weak adjacent node, where the edge weight (e.g., expressed as a numerical value) falls or lies below an edge weight threshold. The edge weight threshold, in turn, may be dynamically set and may denote the criterion for determining whether the associated edge is reflective of a weak relationship between a pair of assets (e.g., a pair of separate datasets or any other structured/tabular forms of information) corresponding to the given key node and a weak adjacent node.

In Step 342, for each weak adjacent node of the weak adjacent node(s) (identified in Step 340), at least a portion of asset metadata, for a weak asset (e.g., any dataset or other structured/tabular form of information) corresponding to the weak adjacent node, is extracted. In one or many embodiment(s) disclosed herein, the extracted portion of asset metadata may include, but is not limited to, one or more dataset features, stewardship (or ownership) information, and compliance information (all briefly defined above—see e.g., Step 306) associated with the weak asset.

Figure 3D:
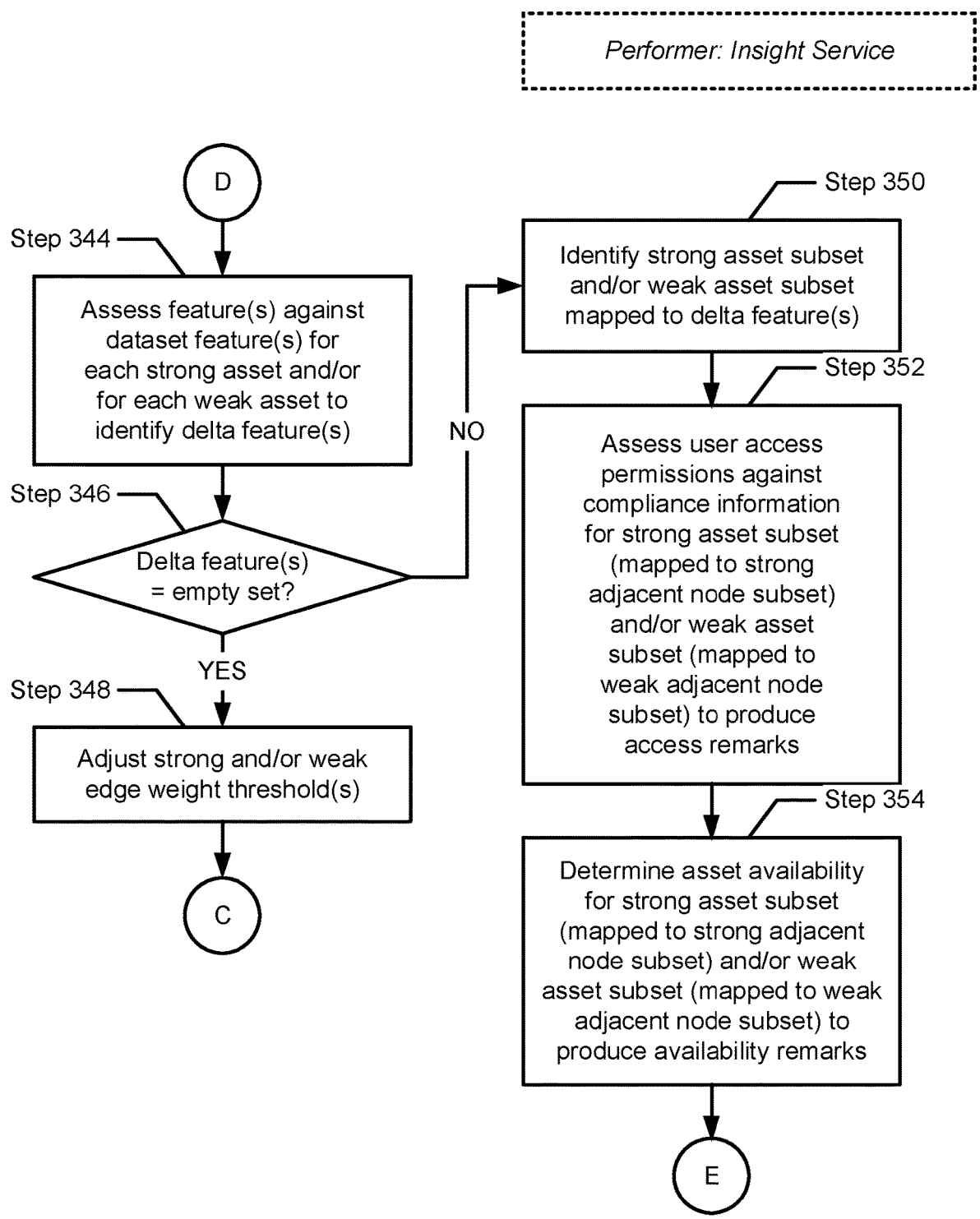

Turning to FIG. 3D, in Step 344, the feature(s) (received via the feature query in Step 300) is/are assessed against the dataset feature(s) (extracted in Step(s) 738 and/or 742) for each strong asset, corresponding respectively to each strong adjacent node of the strong adjacent node(s) (identified in Step 336) and/or for each weak asset corresponding to each weak adjacent node of the weak adjacent node(s) (identified in Step 340). In one or many embodiment(s) disclosed herein, the assessment may, for example, entail word/phrase matching and/or semantic similarity calculation between each feature of the feature(s) and each dataset feature of the dataset feature(s) for each strong asset and/or for each weak asset. Further, the assessment may result in the identification of zero or more delta features. A delta feature (if any) may refer to any non-duplicative (or unique) dataset feature found to be excluded or distinct from any feature of the feature(s). Accordingly, any identified delta feature(s) may represent a supplemental property, factor, or variable that could boost the performance of the ML model(s) being evaluated by the organization user.

In Step 346, a determination is made as to whether the delta feature(s) (if any) (identified in Step 344) reflect(s) an empty set (i.e., a cardinality thereof equals zero). In one or many embodiment(s) disclosed herein, if it is determined that the delta feature(s) (if any) reflect(s) the empty set, then the method proceeds to Step 348. On the other hand, in one or many other embodiment(s) disclosed herein, if it is alternatively determined that the delta feature(s) (if any) reflect(s) a non-empty set (i.e., a cardinality thereof exceeds zero), then the method alternatively proceeds to Step 350.

In Step 348, following the determination (made in Step 346) that the delta feature(s) (if any) (identified in Step 344) reflect(s) an empty set (i.e., a cardinality thereof equals zero), the edge weight threshold(s), defining the criterion(s) for identifying any strong adjacent node(s) and/or any weak adjacent node(s), is/are adjusted. In one or many embodiment(s) disclosed herein, adjustment of any edge weight threshold may generally result in the identification of one or more additional strong adjacent nodes and/or one or more additional weak adjacent nodes. For example, to effect the identification of additional strong adjacent node(s), the edge weight threshold, which denotes the identification criterion for any strong adjacent node, may be lowered. By way of another example, to effect the identification of additional weak adjacent node(s), the edge weight threshold, which denotes the identification criterion for any weak adjacent node, may be raised.

From here, following the adjustment of the edge weight threshold(s) for any strong and/or weak adjacent node(s), the method proceeds to Step 336 (described above) (see e.g., FIG. 3C), where the identification of additional strong and/or weak adjacent node(s) transpire(s) based on the adjusted edge weight threshold(s) associated therewith.

In Step 350, following the alternate determination (made in Step 346) that the delta feature(s) (if any) (identified in Step 344) reflect(s) a non-empty set (i.e., a cardinality thereof exceeds zero), a strong asset subset and/or a weak asset subset is/are identified. In one or many embodiment(s) disclosed herein, the strong asset subset may refer to one or more strong assets representative of at least a portion of the strong asset(s) (e.g., each a dataset or any other structured/tabular form of information) corresponding respectively to the strong adjacent node(s) (identified in Step 336). Meanwhile, the weak asset subset may refer to one or more weak assets representative of at least a portion of the weak asset(s) (e.g., each a dataset or any other structured/tabular form of information) corresponding respectively to the weak adjacent node(s) (identified in Step 340). Further, one or more delta features of the delta feature(s) (identified in Step 344) may map to a separate strong asset in the strong asset subset, or a separate weak asset in the weak asset subset. For example, Delta Features 1 & 2 may map to Strong Asset 1, Delta Features 3-5 may map to Weak Asset 1, Delta Feature 6 may map to Strong Asset 2, and Delta Feature 7 may map to Weak Asset 2.

In Step 352, the user access permissions (obtained in Step 302), associated with the organization user, is assessed against the compliance information (extracted in Step(s) 738 and/or 742) associated with one or more strong assets and/or one or more weak assets. In one or many embodiment(s) disclosed herein, the strong asset(s) may pertain to the strong asset subset (identified in Step 350) and may map to asset catalog entry/entries represented by a strong adjacent node subset of the strong adjacent node(s) (identified in Step 336), whereas the weak asset(s) may pertain to the weak asset subset (additionally, or alternatively, identified in Step 350) and may map to asset catalog entry/entries represented by a weak adjacent node subset of the weak adjacent node(s) (identified in Step 340).

Further, assessment of the user access permissions, against the asset compliance information, may, for example, entail determining: whether a geographical location of the organization user is within the geographical restrictions or boundaries, at least in part, defining access to a strong or weak asset; whether the organization, with which the organization user is associated, is of a particular type (e.g., a commercial business, an educational institution, etc.) to which access and usability of a strong or weak asset is granted; and whether one or more organization roles (e.g., title(s) and/or position(s)) and/or professional affiliation(s) (e.g., membership(s) to professional organization(s)), with which the organization user is associated, satisfies criteria for permitting access to a strong or weak asset.

Moreover, the above-mentioned assessment, between the user access permissions and the asset compliance information, may result in producing access remarks that concern the strong asset(s) of the strong asset subset and/or the weak asset(s) of the weak asset subset, associated with the extracted compliance information. In one or many embodiment(s) disclosed herein, any access remarks may refer to information expressing whether the strong and/or weak asset(s) is/are accessible or inaccessible to/by the organization user. Said information (for any given strong asset of the strong asset subset or any weak asset of the weak asset subset) may include, but is not limited to: an accessibility statement indicating that the given strong or weak asset can or cannot be accessed by the organization user; one or more reasons explaining or supporting the accessibility statement;

a digital reference link (e.g., uniform resource locator or hyperlink) or an access protocol through which the organization user can access the given strong or weak asset should the accessibility statement indicate that the given strong or weak asset can be accessed by the organization user; and/or the stewardship information (extracted in Step(s) 738 and/or 742) associated with the given strong or weak asset should the accessibility statement alternatively indicate that the given strong or weak asset cannot be accessed by the organization user.

In one or many embodiment(s) disclosed herein, stewardship information may be integrated, as part of the access remarks for a given strong asset of the strong asset subset and/or for a given weak asset of the weak asset subset (if applicable—e.g., if the given strong or weak asset is deemed inaccessible), in order to provide the organization user with an opportunity to potentially gain access to the given strong or weak asset through communications with the steward(s) or owner(s) of the given strong or weak asset. The potential to gain access to the given strong or weak asset through this avenue, however, may be moot or disregarded in view of other, higher-tiered compliance policies such as those outlined by geographical restrictions, as well as national and/or international laws, regulations, and standards.

In Step 354, an asset availability, for each of one or more strong assets of the strong asset subset (identified in Step 350), and/or for each of one or more weak assets of the weak asset subset (additionally, or alternatively, identified in Step 350), is determined. In one or many embodiment(s) disclosed herein, the strong asset(s) may map to asset catalog entry/entries represented by a strong adjacent node subset of the strong adjacent node(s) (identified in Step 336), whereas the weak asset(s) may map to asset catalog entry/entries represented by a weak adjacent node subset of the weak adjacent node(s) (identified in Step 340). Further, the determination of asset availability for any given strong or weak asset may, for example, entail the submission of an asset availability query to an appropriate (i.e., internal or external) data source identified in the asset metadata describing the given strong or weak asset. Any asset availability query may include or specify an asset identifier (also found in the asset metadata) that uniquely identifies the given strong or weak asset. Moreover, in response to any asset availability query, a corresponding asset availability reply may be received, which may include or specify an asset availability state indicating whether the given strong or weak asset is available (e.g., obtainable, usable, or reachable) or unavailable (e.g., unobtainable, unusable, or unreachable). Thereafter, the returned asset availability state(s) for the strong and/or weak asset(s), respectively, may be used to produce availability remarks concerning the strong and/or weak asset(s). Any availability remarks may refer to information expressing whether the strong and/or weak asset(s) is/are available or unavailable at/on one or more data sources that the strong and/or weak asset(s) currently reside, or at one time, had resided.

Figure 3E:
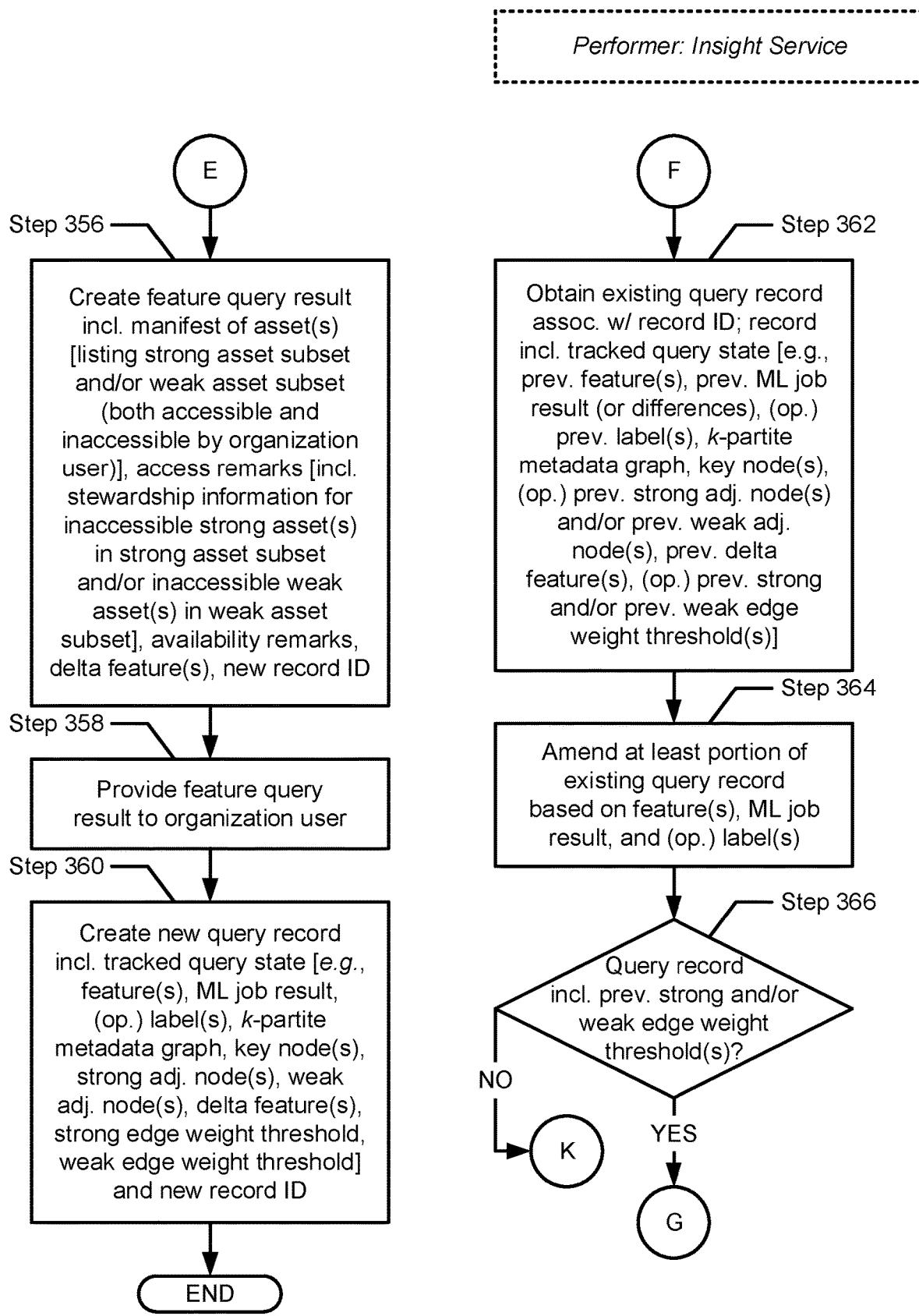

Turning to FIG. 3E, in Step 356, a feature query result is created. In one or many embodiment(s) disclosed herein, the feature query result may include: a manifest of asset(s) listing each of the strong asset(s) of the strong asset subset (identified in Step 350) and/or each of the weak asset(s) of the weak asset subset (additionally, or alternatively, identified in Step 350); the access remarks (produced in Step 352); the availability remarks (produced in Step 354); the delta feature(s) (identified in Step 344); and a new record identifier (ID) representing, for example, a character string that uniquely identifies a query record (described above—see e.g., Step 334).

Examples of said tracked query-pertinent information (also referred to herein as tracked query state) may include, but is not limited to: the feature(s) and the ML job results (received via the feature query in Step 300); the label(s) (if any) (optionally received via the feature query in Step 300); the k-partite metadata graph (generated in Step 314); the key node(s) (identified in Step 316); the strong adjacent node(s) (identified in Step 336); the weak adjacent node(s) (identified in Step 340); the delta feature(s) (identified in Step 344); the (strong) edge weight threshold defining the criterion for identifying the strong adjacent node(s); the (weak) edge weight threshold defining the criterion for identifying the weak adjacent node(s); and the new record ID.

In Step 358, the feature query result (created in Step 356) is provided in response to the feature query (received in Step 300). Particularly, in one or many embodiment(s) disclosed herein, the feature query result may be provided to the organization user who had submitted the feature query.

In Step 360, a new query record is created. In one or many embodiment(s) disclosed herein, the new query record may be identified using the new record ID (mentioned in Step 356) and, accordingly, may be associated with the feature query (received in Step 300).

In Step 362, following the alternate determination (made in Step 304) that a record ID had been received via the feature query (in Step 300), an existing query record is obtained. In one or many embodiment(s) disclosed herein, the existing query record may be associated with, and thus may be recalled/retrieved using, the aforementioned record ID. Further, the existing query record include existing tracked query state.

By way of examples, the existing tracked query state may include, but is not limited to: one or more previous features (i.e., one or more features submitted in a previous feature query by the organization user concerning one or more evaluated ML models); one or more previous labels (if any had optionally been received) (i.e., one or more labels submitted in a previous feature query by the organization user concerning one or more evaluated ML models; a previous ML job result (i.e., the ML job result submitted in a previous feature query by the organization user concerning one or more evaluated ML models) and/or any previous difference(s) between separate, successive ML job results (which may have been submitted in multiple previous feature queries by the organization user concerning one or more evaluated ML models); a k-partite metadata graph (generated during a processing of a previous/original feature query submitted by the organization that concerned one or more evaluated ML models); one or more key nodes (identified in/of the aforementioned k-partite metadata graph during a processing of a previous/original feature query submitted by the organization user that concerned one or more evaluated ML models); (optionally) one or more previous strong adjacent nodes (i.e., one or more strong adjacent nodes if any had been identified during the processing of a previous feature query submitted by the organization user that concerned one or more evaluated ML models); (optionally) one or more previous weak adjacent nodes (i.e., one or more weak adjacent nodes if any had been identified during the processing of a previous feature query submitted by the organization user that concerned one or more evaluated ML models); one or more previous delta features (i.e., one or more delta features identified during the processing of a previous feature query submitted by the organization user that concerned one or more evaluated ML models); (optionally) a previous (strong) edge weight threshold defining the criterion for identifying the previous strong adjacent node(s) (i.e., an edge weight threshold for identifying one or more strong adjacent nodes that had been employed during the processing of a previous feature query submitted by the organization user that concerned one or more evaluated ML models); and (optionally) a previous (weak) edge weight threshold defining the criterion for identifying the previous weak adjacent node(s) (i.e., an edge weight threshold for identifying one or more weak adjacent nodes that had been employed during the processing of a previous feature query submitted by the organization user that concerned one or more evaluated ML model(s). The existing tracked query state, further, is not limited to the aforementioned specific examples.

In Step 364, the existing query record (obtained in Step 362) (or at least a portion thereof) is amended. In one or many embodiment(s) disclosed herein, amending of the existing query record (or at least a portion thereof) may, for example, entail: replacing the previous feature(s) specified therein with the feature(s) (received via the feature query in Step 300); replacing the previous ML job result with the ML job result (also received via the feature query in Step 300) and/or (a) determining any difference(s) between the previous ML job result and the ML job result, and (b) replacing the previous difference(s) with the determined difference(s); and/or replacing the previous label(s) with the label(s) (if any had been received via the feature query in Step 300).

In Step 366, a determination is made as to whether the existing query record (obtained in Step 362) includes or specifies a previous (strong) edge weight threshold and/or a previous (weak) edge weight threshold. In one or many embodiment(s) disclosed herein, if it is determined that the existing query record includes/specifies any previous (strong and/or weak) edge weight threshold(s), then the method proceeds to Step 368 (see e.g., FIG. 3F). On the other hand, in one or many other embodiment(s) disclosed herein, if it is alternatively determined that the existing query record does not include/specify any previous (strong and/or weak) edge weight threshold(s), then the method alternatively proceeds to Step 372 (see e.g., FIG. 3F).

Figure 3F:
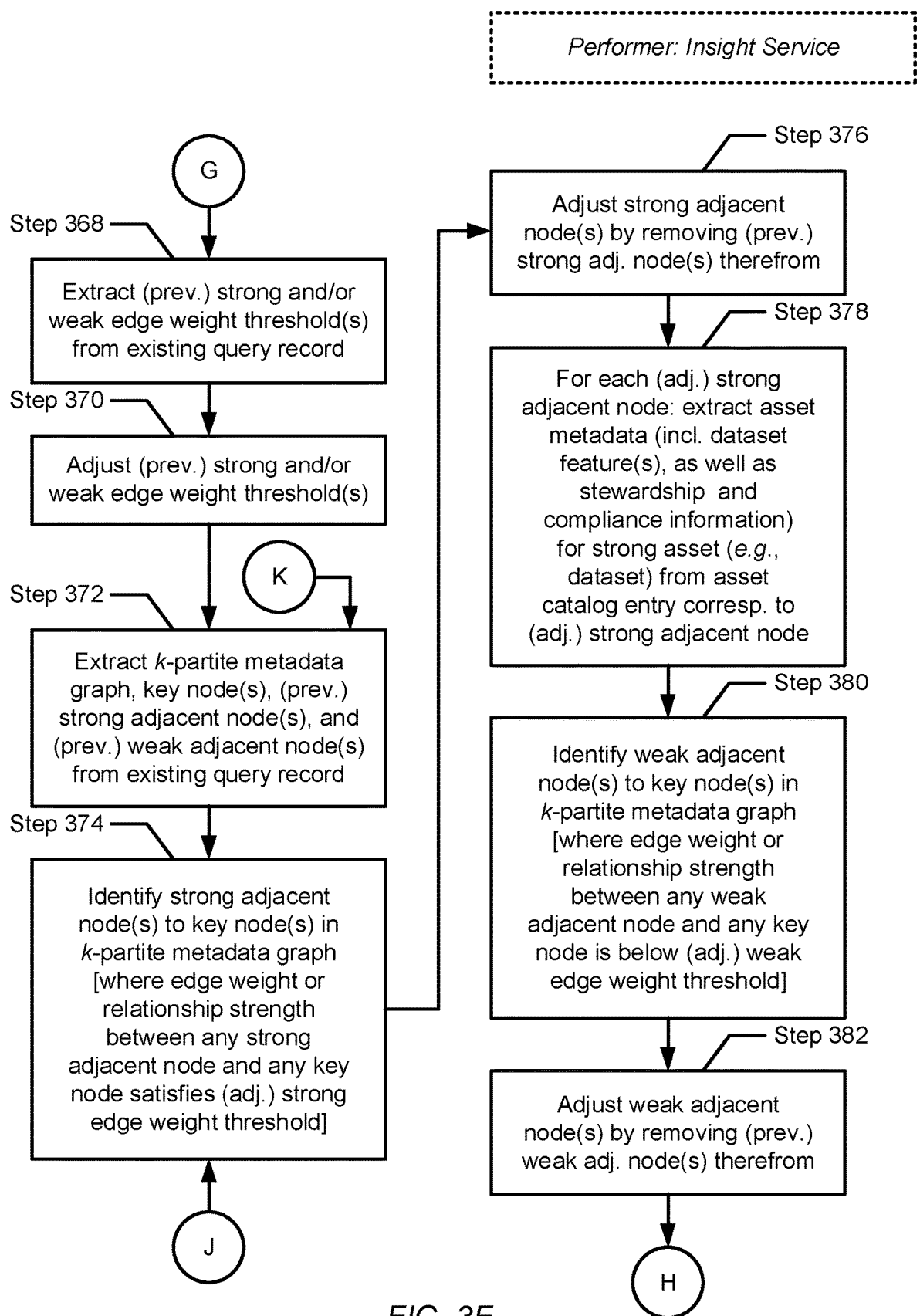

Turning to FIG. 3F, in Step 368, following the determination (made in Step 366) that the existing query record (obtained in Step 362) includes/specifies any previous (strong and/or weak) edge weight threshold(s), said previous (strong and/or weak) edge weight threshold(s) is/are extracted therefrom.

In Step 370, the previous (strong and/or weak) edge weight threshold(s) (extracted in Step 368) is/are adjusted. In one or many embodiment(s) disclosed herein, adjustment of any edge weight threshold may generally result in the identification of one or more additional strong adjacent nodes and/or one or more additional weak adjacent nodes. For example, to effect the identification of additional strong adjacent node(s), the (strong) edge weight threshold, which denotes the identification criterion for any strong adjacent node, may be lowered. By way of another example, to effect the identification of additional weak adjacent node(s), the (weak) edge weight threshold, which denotes the identification criterion for any weak adjacent node, may be raised.

In Step 372, following adjustment of the previous (strong and/or weak) edge weight threshold(s) (in Step 370), the k-partite metadata graph, the key node(s), the previous strong adjacent node(s), and the previous weak adjacent node(s) are extracted from the existing query record. Alternatively, following the alternate determination (made in Step 366) that the existing query record (obtained in Step 362) does not include/specify any said previous (strong and/or weak) edge weight threshold(s), only the k-partite metadata graph and the key node(s) are extracted from the existing query record.

In Step 374, for each key node of the key node(s) (extracted in Step 372), one or more (new) strong adjacent nodes, in/of the k-partite metadata graph (also extracted in Step 372), is/are identified. In one or many embodiment(s) disclosed herein, the (new) strong adjacent node(s) may be identified based on either a default (strong) edge weight threshold (if Steps 768 and 770 had not transpired) or an adjusted (strong) edge weight threshold (if Steps 768 and 770 had transpired).

Optionally, in Step 376, the (new) strong adjacent node(s) (identified in Step 374) is/are adjusted. Specifically, in one or many embodiment(s) disclosed herein, any previous strong adjacent node(s) (extracted in Step 372) is/are removed from the (new) strong adjacent node(s). The resulting (new) strong adjacent node(s), therefore, may include at least one strong adjacent node that has yet to be identified during the processing of any previous (or the original) feature query submitted by the organization user that concerns the evaluated ML model(s).

In Step 378, for each (new) strong adjacent node of the (new) strong adjacent node(s) (identified in Step 374 or resulted via the adjustment in Step 376), at least a portion of asset metadata, for a (new) strong asset (e.g., any dataset or other structured/tabular form of information) corresponding to the (new) strong adjacent node, is extracted. In one or many embodiment(s) disclosed herein, the extracted portion of asset metadata may include, but is not limited to, one or more dataset features, stewardship (or ownership) information, and compliance information (all briefly defined above—see e.g., Step 306) associated with the (new) strong asset.

Additionally, or alternatively, in Step 380, for each key node of the key node(s) (extracted in Step 372), one or more (new) weak adjacent nodes, in/of the k-partite metadata graph (also extracted in Step 372), is/are identified. In one or many embodiment(s) disclosed herein, the (new) weak adjacent node(s) may be identified based on either a default (weak) edge weight threshold (if Steps 768 and 770 had not transpired) or an adjusted (weak) edge weight threshold (if Steps 768 and 770 had transpired).

Optionally, in Step 382, the (new) weak adjacent node(s) (identified in Step 380) is/are adjusted. Specifically, in one or many embodiment(s) disclosed herein, any previous weak adjacent node(s) (extracted in Step 372) is/are removed from the (new) weak adjacent node(s). The resulting (new) weak adjacent node(s), therefore, may include at least one weak adjacent node that has yet to be identified during the processing of any previous (or the original) feature query submitted by the organization user that concerns the evaluated ML model(s).

Figure 3G:
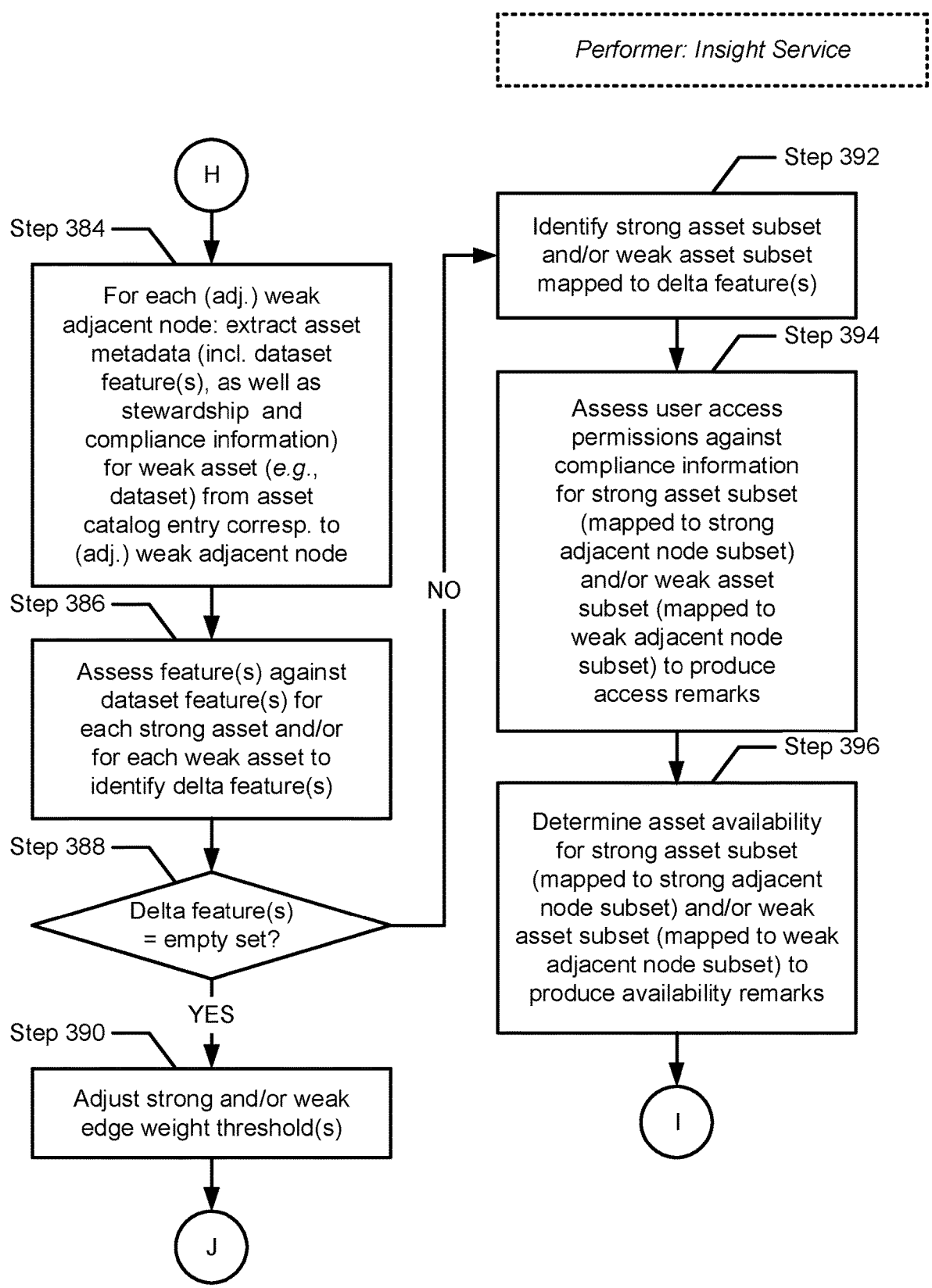

Turning to FIG. 3G, in Step 384, for each (new) weak adjacent node of the (new) weak adjacent node(s) (identified in Step 380 or resulted via the adjustment in Step 382), at least a portion of asset metadata, for a (new) weak asset (e.g., any dataset or other structured/tabular form of information) corresponding to the (new) weak adjacent node, is extracted. In one or many embodiment(s) disclosed herein, the extracted portion of asset metadata may include, but is not limited to, one or more dataset features, stewardship (or ownership) information, and compliance information (all briefly defined above—see e.g., Step 306) associated with the (new) weak asset.

In Step 386, the feature(s) (received via the feature query in Step 300) is/are assessed against the dataset feature(s) (extracted in Step(s) 778 and/or 784) for each (new) strong asset, corresponding respectively to each (new) strong adjacent node of the (new) strong adjacent node(s) (identified in Step 374 or resulted via the adjustment in Step 376) and/or for each (new) weak asset corresponding to each (new) weak adjacent node of the (new) weak adjacent node(s) (identified in Step 380 or resulted via the adjustment in Step 382). In one or many embodiment(s) disclosed herein, the assessment may, for example, entail word/phrase matching and/or calculating a semantic similarity between each feature of the feature(s) and each dataset feature of the dataset feature(s) for each (new) strong asset and/or for each (new) weak asset. Further, the assessment may result in the identification of zero or more (new) delta features. A (new) delta feature (if any) may refer to any non-duplicative (or unique) dataset feature found to be excluded or distinct from any feature of the feature(s). Accordingly, any identified delta feature(s) may represent a supplemental property, factor, or variable that could boost the performance of the ML model(s) being evaluated by the organization user.

In Step 388, a determination is made as to whether the (new) delta feature(s) (if any) (identified in Step 386) reflect(s) an empty set (i.e., a cardinality thereof equals zero). In one or many embodiment(s) disclosed herein, if it is determined that the (new) delta feature(s) (if any) reflect(s) the empty set, then the method proceeds to Step 390. On the other hand, in one or many other embodiment(s) disclosed herein, if it is alternatively determined that the (new) delta feature(s) (if any) reflect(s) a non-empty set (i.e., a cardinality thereof exceeds zero), then the method alternatively proceeds to Step 392.

In Step 390, following the determination (made in Step 388) that the (new) delta feature(s) (if any) (identified in Step 386) reflect(s) an empty set (i.e., a cardinality thereof equals zero), the edge weight threshold(s), defining the criterion(s) for identifying any (new) strong adjacent node(s) and/or any (new) weak adjacent node(s), is/are adjusted. In one or many embodiment(s) disclosed herein, adjustment of any edge weight threshold may generally result in the identification of one or more additional (new) strong adjacent nodes and/or one or more additional (new) weak adjacent nodes. For example, to effect the identification of additional (new) strong adjacent node(s), the (strong) edge weight threshold, which denotes the identification criterion for any (new) strong adjacent node, may be lowered. By way of another example, to effect the identification of additional (new) weak adjacent node(s), the (weak) edge weight threshold, which denotes the identification criterion for any (new) weak adjacent node, may be raised.

From here, following the adjustment of the edge weight threshold(s) for any (new) strong and/or (new) weak adjacent node(s), the method proceeds to Step 374 (described above) (see e.g., FIG. 3F), where the identification of additional (new) strong and/or (new) weak adjacent node(s) transpire(s) based on the adjusted edge weight threshold(s) associated therewith.

In Step 392, following the alternate determination (made in Step 388) that the (new) delta feature(s) (if any) (identified in Step 386) reflect(s) a non-empty set (i.e., a cardinality thereof exceeds zero), a (new) strong asset subset and/or a (new) weak asset subset is/are identified. In one or many embodiment(s) disclosed herein, the (new) strong asset subset may refer to one or more (new) strong assets representative of at least a portion of the (new) strong asset(s) (e.g., each a dataset or any other structured/tabular form of information) corresponding respectively to the (new) strong adjacent node(s) (identified in Step 374 or resulted via the adjustment in Step 376). Meanwhile, the (new) weak asset subset may refer to one or more (new) weak assets representative of at least a portion of the (new) weak asset(s) (e.g., each a dataset or any other structured/tabular form of information) corresponding respectively to the (new) weak adjacent node(s) (identified in Step 380 or resulted via the adjustment in Step 382). Further, one or more (new) delta features of the (new) delta feature(s) (identified in Step 386) may map to a separate (new) strong asset in the (new) strong asset subset, or a separate (new) weak asset in the (new) weak asset subset. For example, New Delta Features 1 & 2 may map to New Strong Asset 1, New Delta Features 3-5 may map to New Weak Asset 1, New Delta Feature 6 may map to New Strong Asset 2, and New Delta Feature 7 may map to New Weak Asset 2.

In Step 394, the user access permissions (obtained in Step 302), associated with the organization user, is assessed against the compliance information (extracted in Step(s) 778 and/or 784) associated with one or more (new) strong assets and/or one or more (new) weak assets. In one or many embodiment(s) disclosed herein, the (new) strong asset(s) may pertain to the (new) strong asset subset (identified in Step 392) and may map to asset catalog entry/entries represented by a (new) strong adjacent node subset of the (new) strong adjacent node(s) (identified in Step 374 or resulted via the adjustment in Step 376), whereas the (new) weak asset(s) may pertain to the (new) weak asset subset (additionally, or alternatively, identified in Step 392) and may map to asset catalog entry/entries represented by a (new) weak adjacent node subset of the (new) weak adjacent node(s) (identified in Step 380 or resulted via the adjustment in Step 382).

Further, assessment of the user access permissions, against the asset compliance information, may, for example, entail determining: whether a geographical location of the organization user is within the geographical restrictions or boundaries, at least in part, defining access to a (new) strong or (new) weak asset; whether the organization, with which the organization user is associated, is of a particular type (e.g., a commercial business, an educational institution, etc.) to which access and usability of a (new) strong or (new) weak asset is granted; and whether one or more organization roles (e.g., title(s) and/or position(s)) and/or professional affiliation(s) (e.g., membership(s) to professional organization(s)), with which the organization user is associated, satisfies criteria for permitting access to a (new) strong or (new) weak asset.

Moreover, the above-mentioned assessment, between the user access permissions and the asset compliance information, may result in producing (new) access remarks that concern the (new) strong asset(s) of the (new) strong asset subset and/or the (new) weak asset(s) of the (new) weak asset subset, associated with the extracted compliance information. In one or many embodiment(s) disclosed herein, any (new) access remarks may refer to information expressing whether the (new) strong and/or (new) weak asset(s) is/are accessible or inaccessible to/by the organization user. Said information (for any given (new) strong asset of the (new) strong asset subset or any (new) weak asset of the (new) weak asset subset) may include, but is not limited to: an accessibility statement indicating that the given (new) strong or (new) weak asset can or cannot be accessed by the organization user; one or more reasons explaining or supporting the accessibility statement; a digital reference link (e.g., uniform resource locator or hyperlink) or an access protocol through which the organization user can access the given (new) strong or (new) weak asset should the accessibility statement indicate that the given (new) strong or (new) weak asset can be accessed by the organization user; and/or the stewardship information (extracted in Step(s) 778 and/or 784) associated with the given (new) strong or (new) weak asset should the accessibility statement alternatively indicate that the given (new) strong or (new) weak asset cannot be accessed by the organization user.

In one or many embodiment(s) disclosed herein, stewardship information may be integrated, as part of the (new) access remarks for a given (new) strong asset of the (new) strong asset subset and/or for a given (new) weak asset of the (new) weak asset subset (if applicable—e.g., if the given (new) strong or (new) weak asset is deemed inaccessible), in order to provide the organization user with an opportunity to potentially gain access to the given (new) strong or (new) weak asset through communications with the steward(s) or owner(s) of the given (new) strong or (new) weak asset. The potential to gain access to the given (new) strong or (new) weak asset through this avenue, however, may be moot or disregarded in view of other, higher-tiered compliance policies such as those outlined by geographical restrictions, as well as national and/or international laws, regulations, and standards.

In Step 396, a/an (new) asset availability, for each of one or more (new) strong assets of the (new) strong asset subset (identified in Step 392), and/or for each of one or more (new) weak assets of the (new) weak asset subset (additionally, or alternatively, identified in Step 392), is determined. In one or many embodiment(s) disclosed herein, the (new) strong asset(s) may map to asset catalog entry/entries represented by a (new) strong adjacent node subset of the (new) strong adjacent node(s) (identified in Step 374 or resulted via the adjustment in Step 376), whereas the (new) weak asset(s) may map to asset catalog entry/entries represented by a (new) weak adjacent node subset of the (new) weak adjacent node(s) (identified in Step 380 or resulted via the adjustment in Step 382). Further, the determination of (new) asset availability for any given (new) strong or (new) weak asset may, for example, entail the submission of an asset availability query to an appropriate (i.e., internal or external) data source identified in the asset metadata describing the given (new) strong or (new) weak asset. Any asset availability query may include or specify an asset identifier (also found in the asset metadata) that uniquely identifies the given (new) strong or (new) weak asset. Moreover, in response to any asset availability query, a corresponding asset availability reply may be received, which may include or specify an asset availability state indicating whether the given (new) strong or (new) weak asset is available (e.g., obtainable, usable, or reachable) or unavailable (e.g., unobtainable, unusable, or unreachable). Thereafter, the returned asset availability state(s) for the (new) strong and/or (new) weak asset(s), respectively, may be used to produce (new) availability remarks concerning the (new) strong and/or (new) weak asset(s). Any (new) availability remarks may refer to information expressing whether the (new) strong and/or (new) weak asset(s) is/are available or unavailable at/on one or more data sources that the (new) strong and/or (new) weak asset(s) currently reside, or at one time, had resided.

Figure 3H:
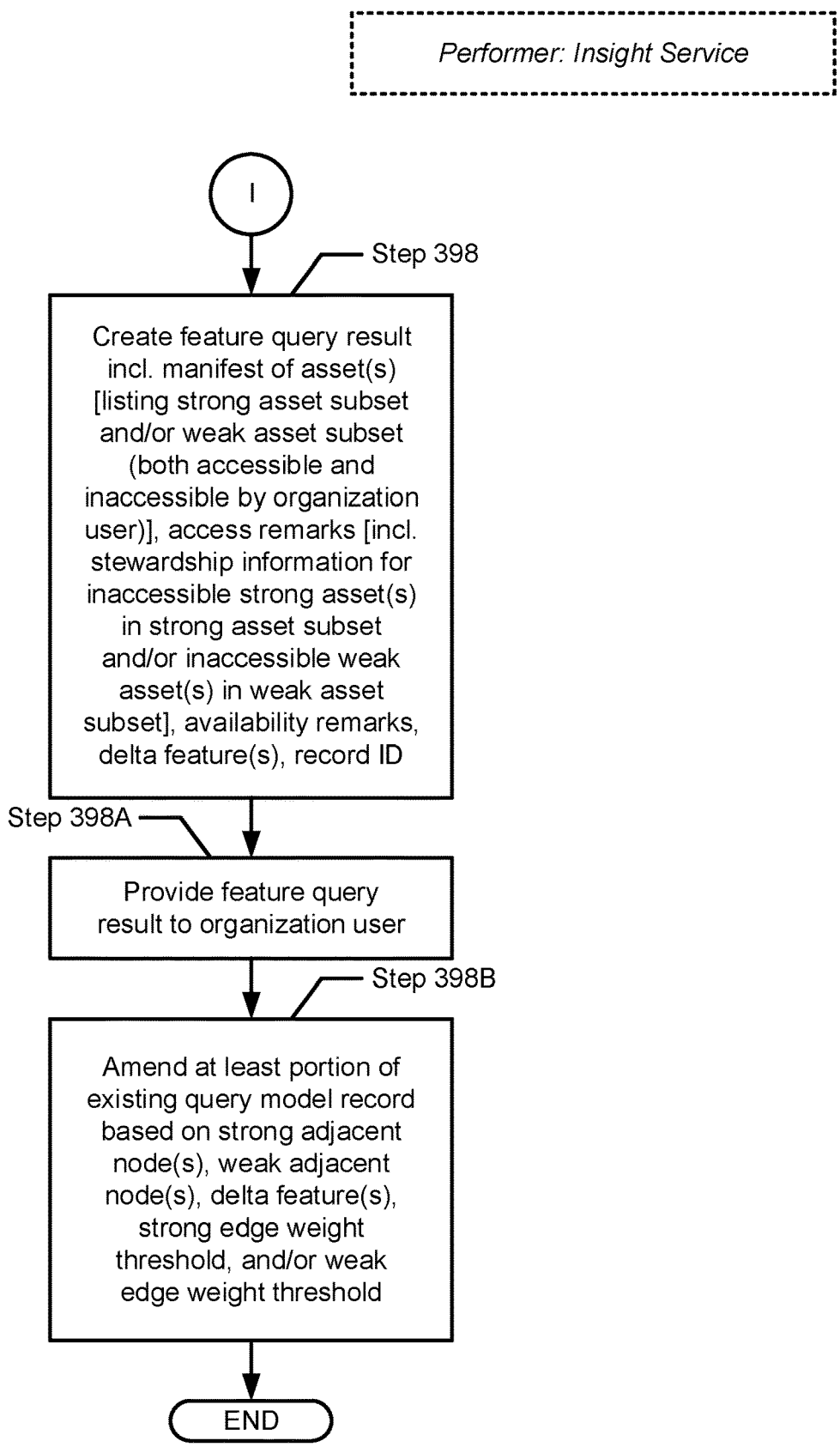

Turning to FIG. 3H, in Step 398, a feature query result is created. In one or many embodiment(s) disclosed herein, the feature query result may include: a manifest of asset(s) listing each of the (new) strong asset(s) of the (new) strong asset subset (identified in Step 392) and/or each of the (new) weak asset(s) of the (new) weak asset subset (additionally, or alternatively, identified in Step 392); the (new) access remarks (produced in Step 394); the (new) availability remarks (produced in Step 396); the (new) delta feature(s) (identified in Step 386); and the record ID (received via the feature query in Step 300).

In Step 398A, the feature query result (created in Step 798) is provided in response to the feature query (received in Step 300). Particularly, in one or many embodiment(s) disclosed herein, the feature query result may be provided to the organization user who had submitted the feature query.

In Step 398B, the existing query record (amended in Step 364) (or at least a portion thereof) is further amended. In one or many embodiment(s) disclosed herein, further amending of the existing query record (or at least a portion thereof) may, for example, entail: adding the (new) strong adjacent node(s) (identified in Step 374 or resulted via the adjustment in Step 376) (i.e., if it had been determined in Step 366 that the existing query record excluded any previous strong edge weight threshold) or replacing the previous strong adjacent node(s), included/specified in the existing query record, with the aforementioned (new) strong adjacent node(s) (i.e., if it had alternatively been determined in Step 366 that the existing query record included any previous strong edge weight threshold); adding the (new) weak adjacent node(s) (identified in Step 380 or resulted via the adjustment in Step 382) (i.e., if it had been determined in Step 366 that the existing query record excluded any previous weak edge weight threshold) or replacing the previous weak adjacent node(s), included/specified in the existing query record, with the aforementioned (new) weak adjacent node(s) (i.e., if it had alternatively been determined in Step 366 that the existing query record included any previous weak edge weight threshold); replacing the previous delta feature(s) with the (new) delta feature(s) (identified in Step 386); adding (a) the default (strong) edge weight threshold (if Steps 768 and 770 had not transpired) or (b) the adjusted (strong) edge weight threshold (if Steps 768 and 770 had transpired) (i.e., if for either case (a) or (b), it had been determined in Step 366 that the existing query record excluded any previous strong edge weight threshold) or replacing the previous (strong) edge weight threshold, included/specified in the existing query record, with the aforementioned adjusted (strong) edge weight threshold; and adding (c) the default (weak) edge weight threshold (if Steps 768 and 770 had not transpired) or (d) the adjusted (weak) edge weight threshold (if Steps 768 and 770 had transpired) (i.e., if for either case (c) or (d), it had been determined in Step 366 that the existing query record excluded any previous weak edge weight threshold) or replacing the previous (weak) edge weight threshold, included/specified in the existing query record, with the aforementioned adjusted (weak) edge weight threshold.

Figure 4:
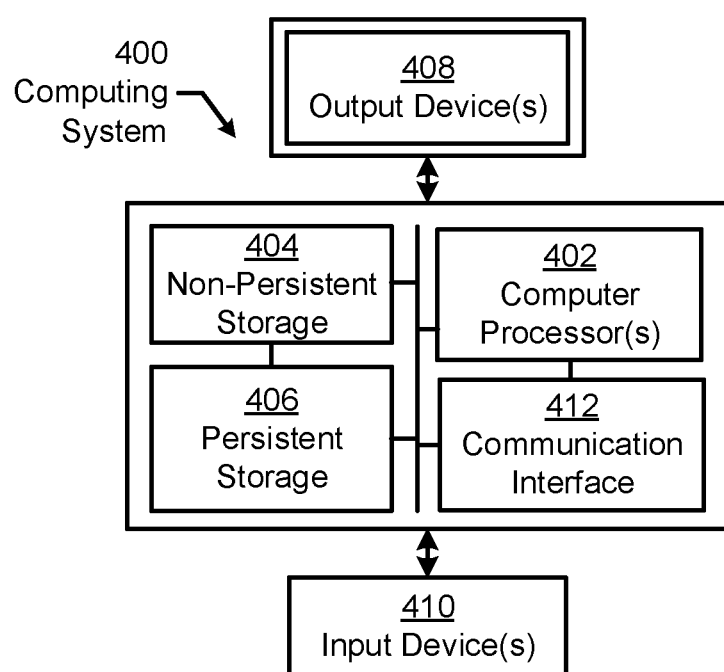
FIG. 4 shows an example computing system in accordance with one or more embodiments disclosed herein.

FIG. 4 shows an example computing system in accordance with one or more embodiments disclosed herein. The computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment disclosed herein, the computer processor(s) (402) may be an integrated circuit for processing instructions. For example, the computer processor(s) may be one or more cores or micro-cores of a central processing unit (CPU) and/or a graphics processing unit (GPU). The computing system (400) may also include one or more input devices (410), such as a touchscreen, keyboard, mouse, microphone, touchpad, electronic pen, or any other type of input device. Further, the communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

In one embodiment disclosed herein, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5A:
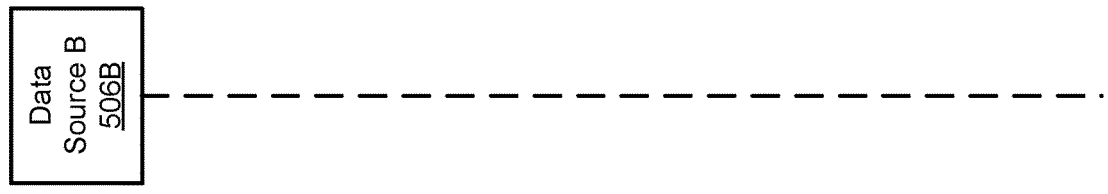
FIGS. 5A-5O show an example scenario in accordance with one or more embodiments disclosed herein.
Figure 5A:
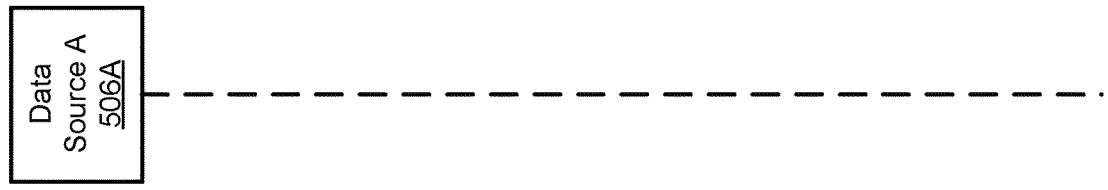
Figure 5A:
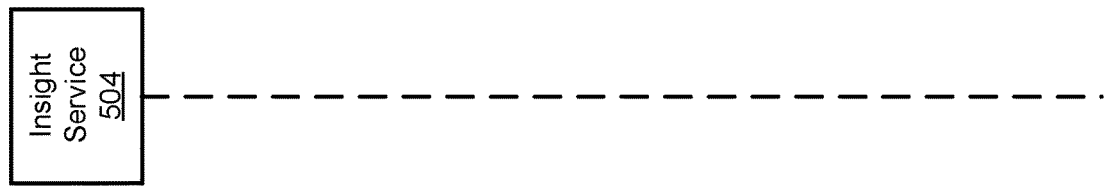
Figure 5A:
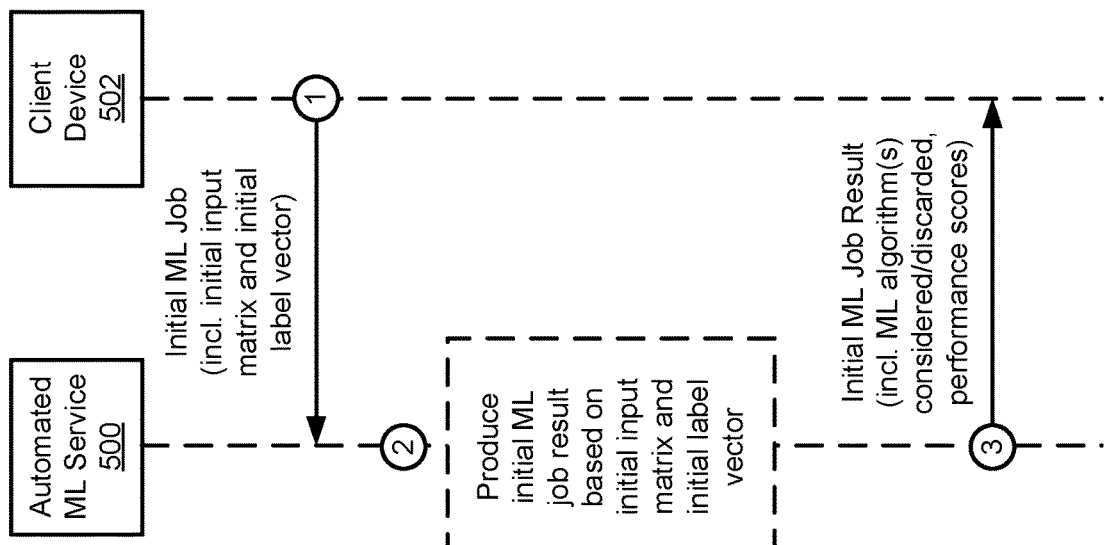
Figure 5B:
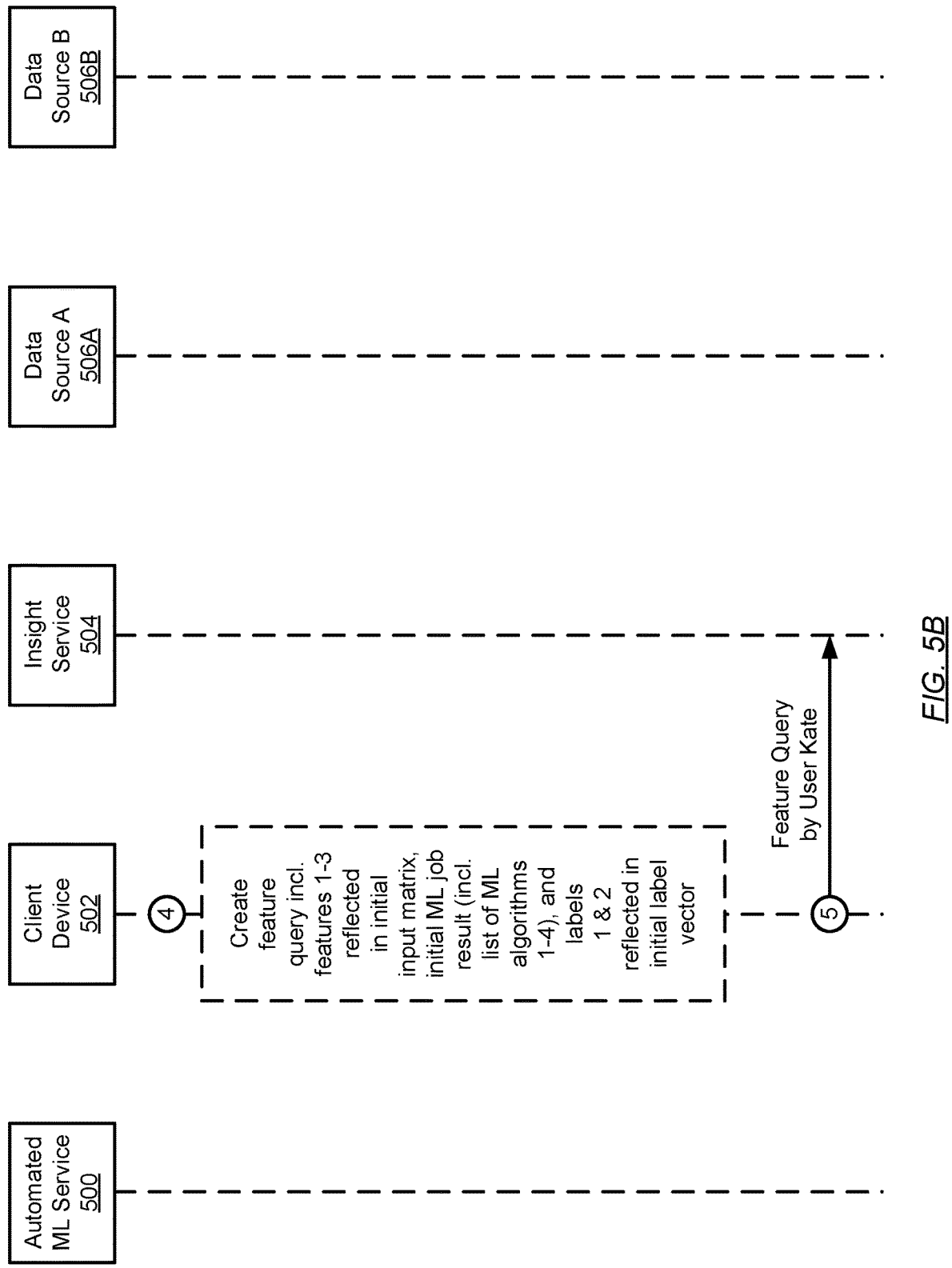
Figure 5C:
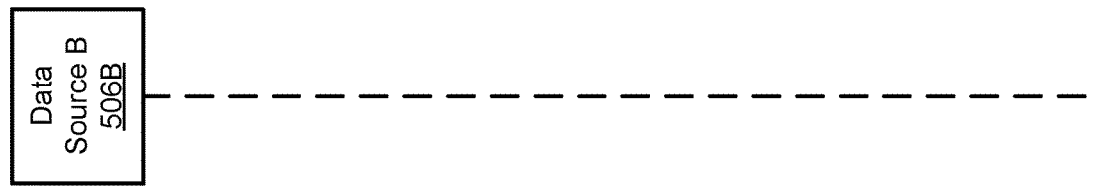
Figure 5C:
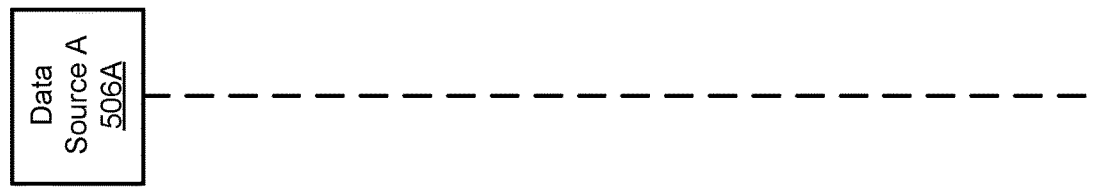
Figure 5C:
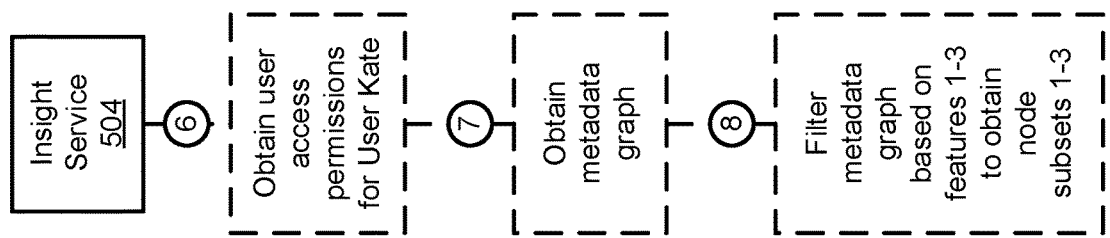
Figure 5F:
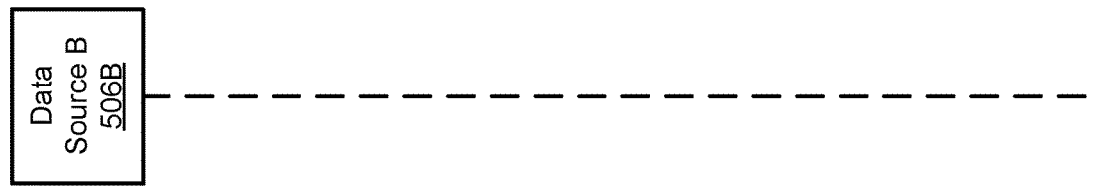
Figure 5F:
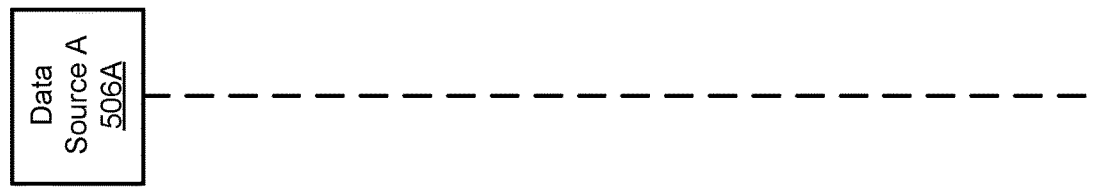
Figure 5F:
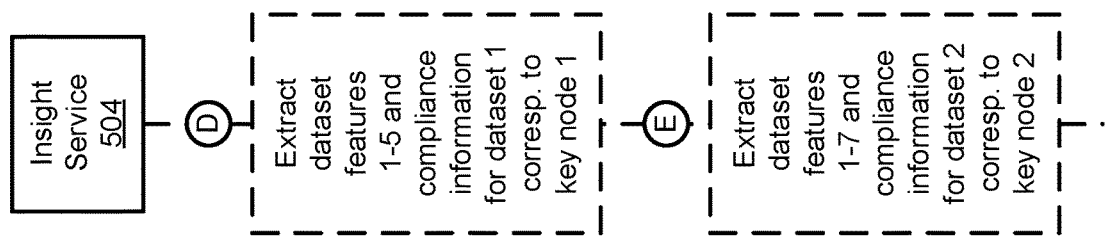
Figure 5F:
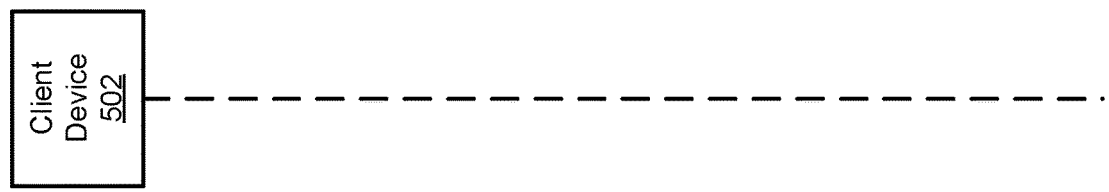
Figure 5F:
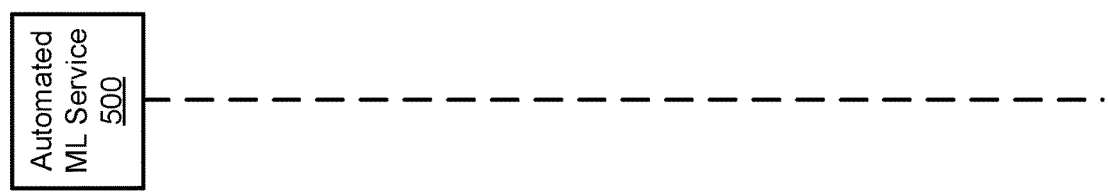
Figure 5G:
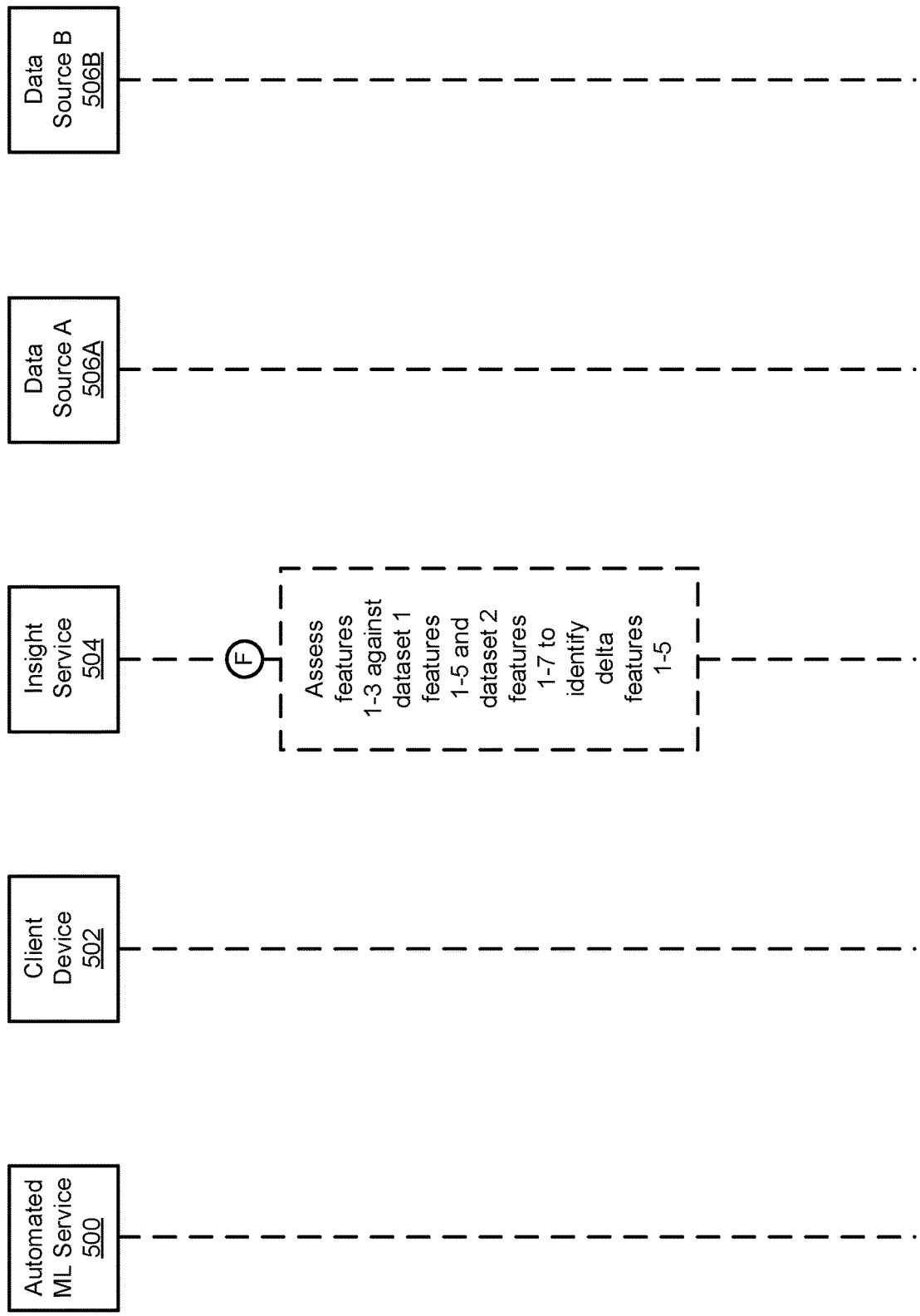
Figure 5I:
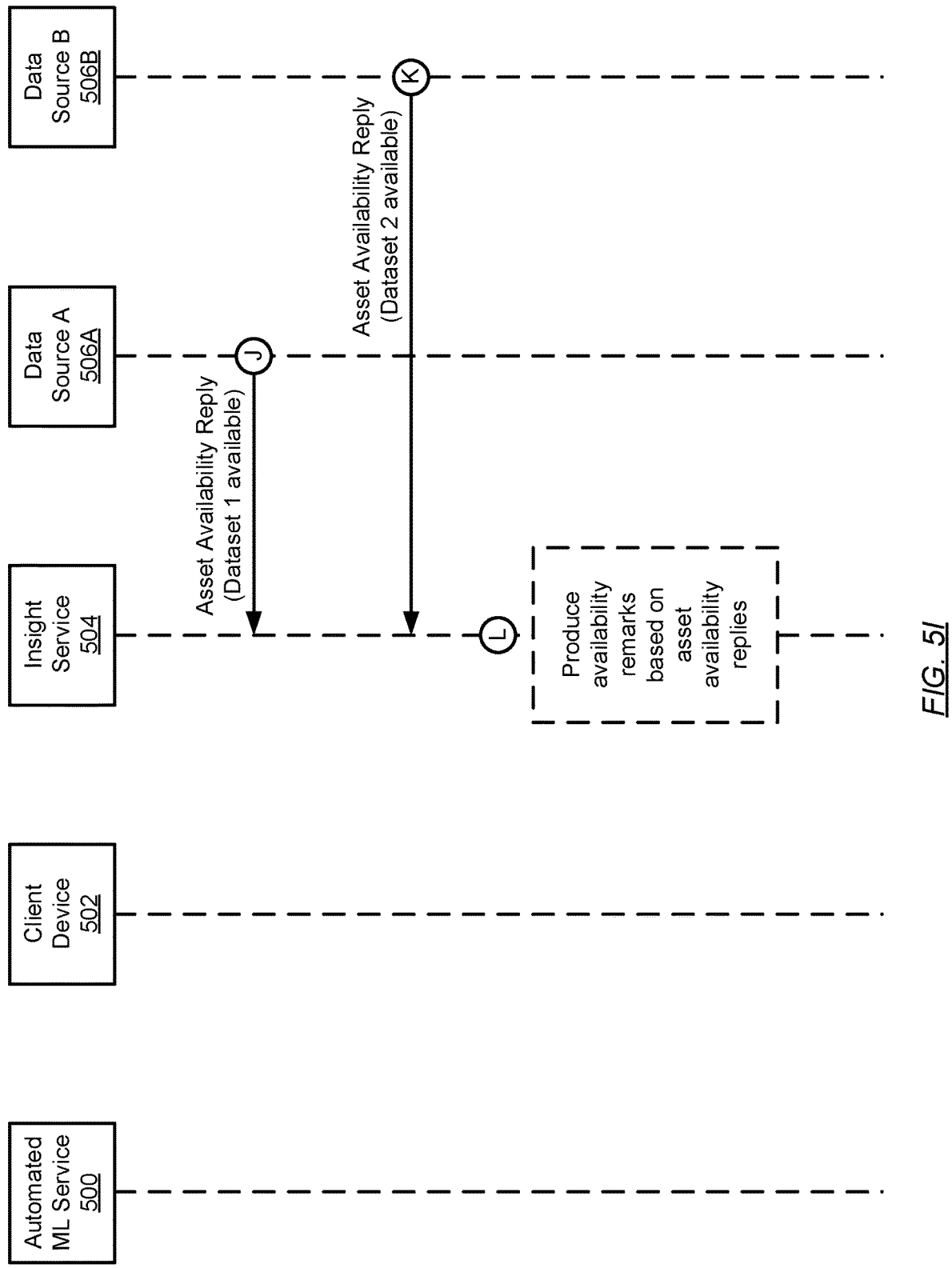
Figure 5L:
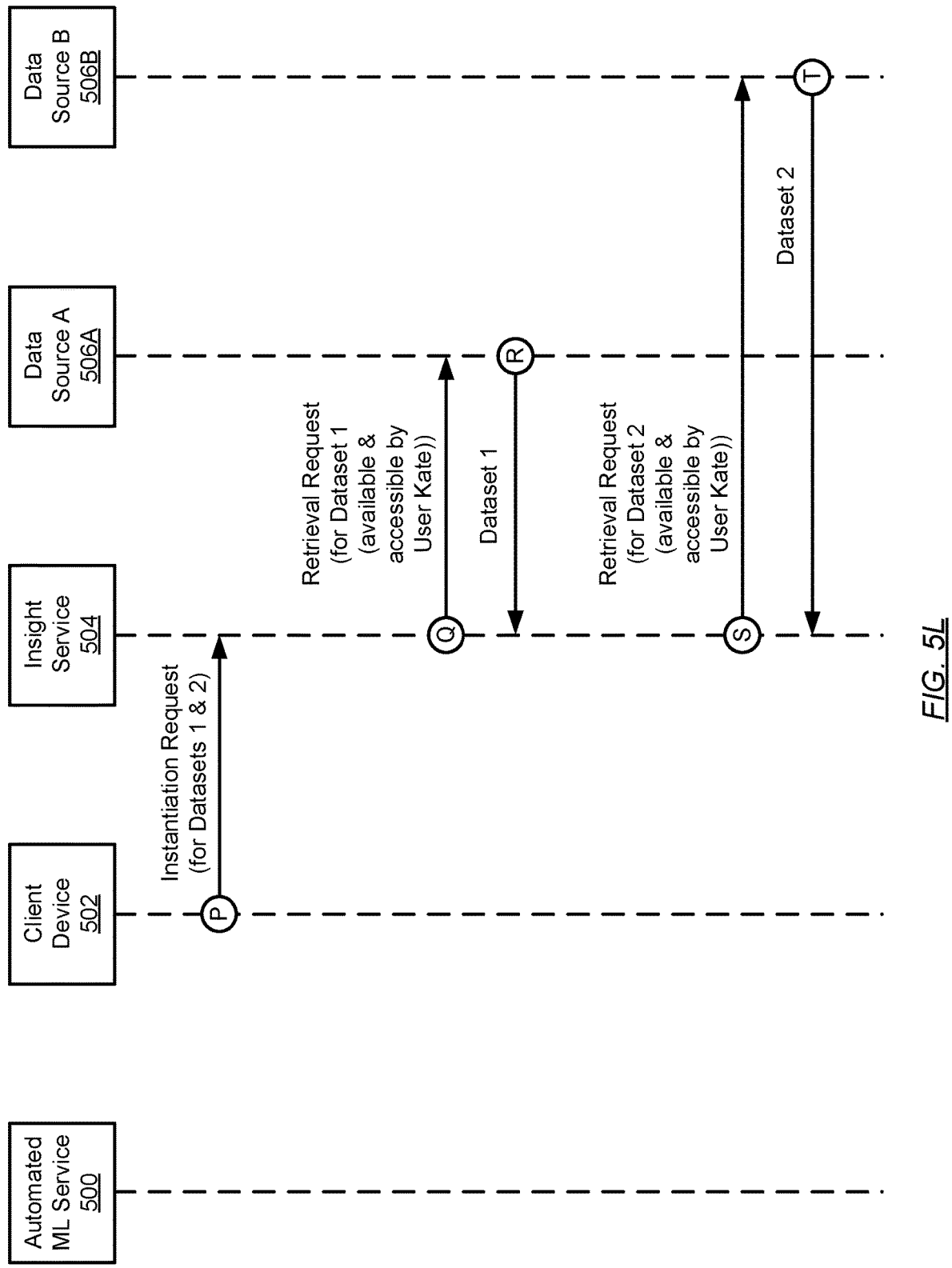
Figure 5M:
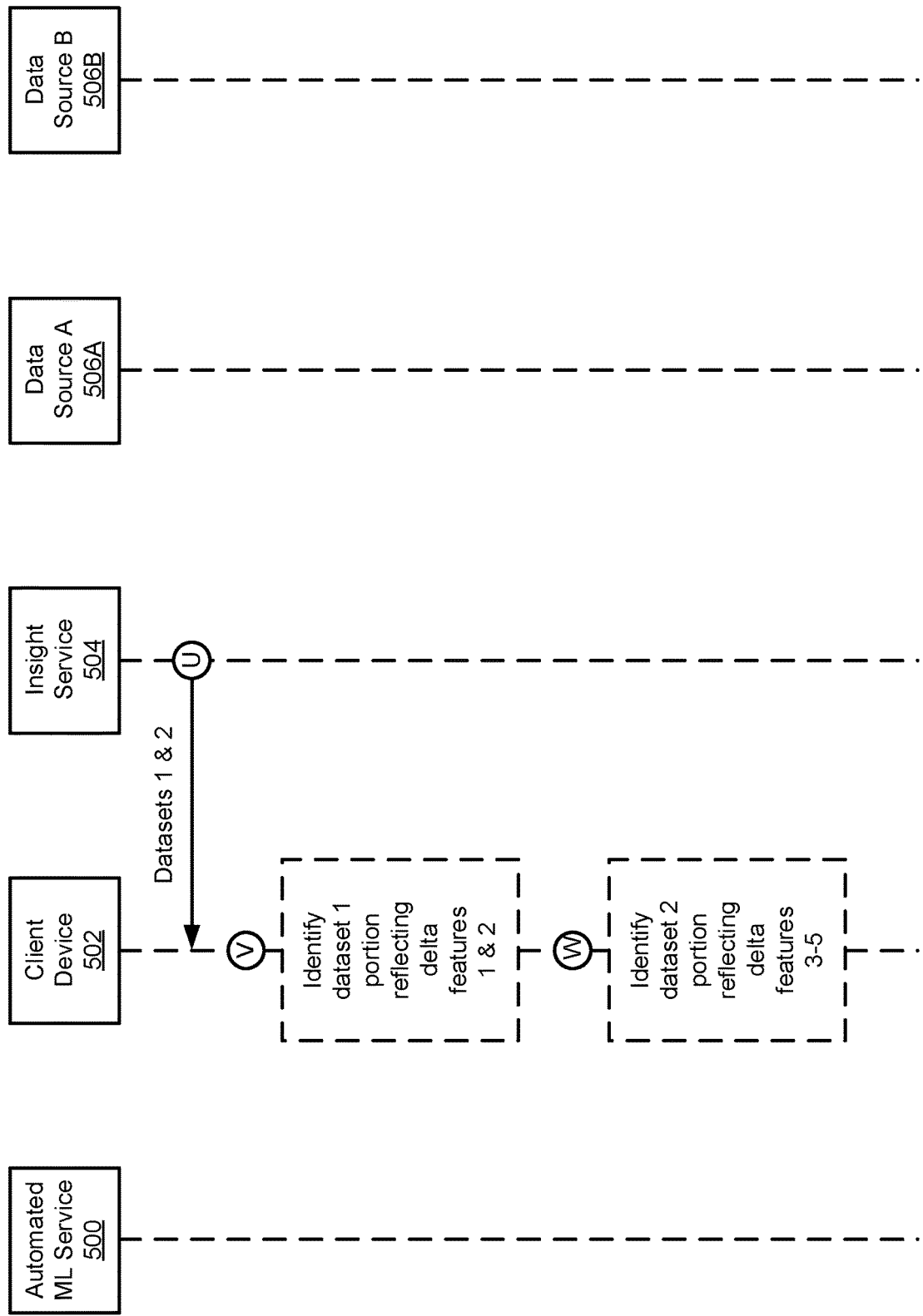
Figure 5N:
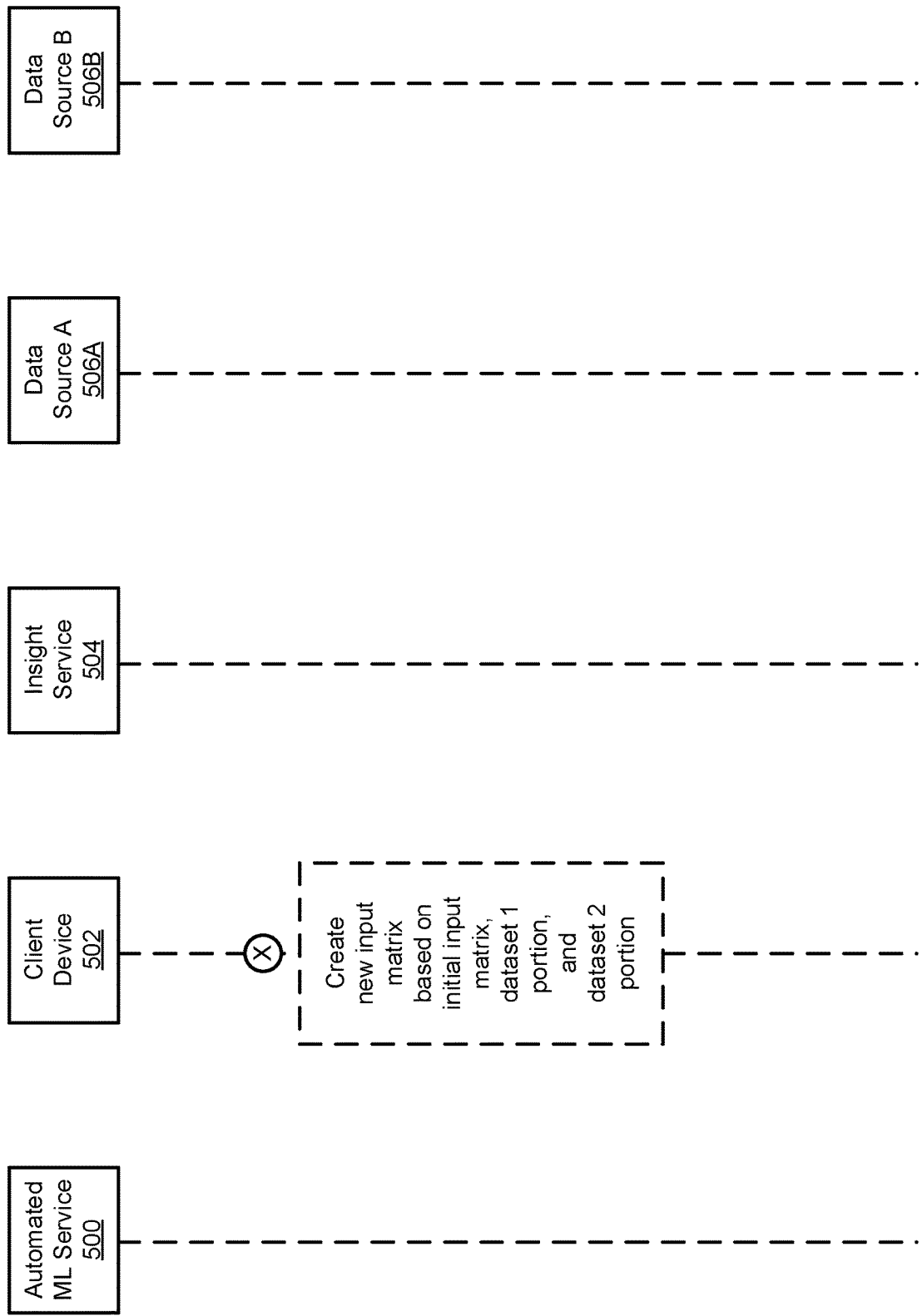
Figure 5O:
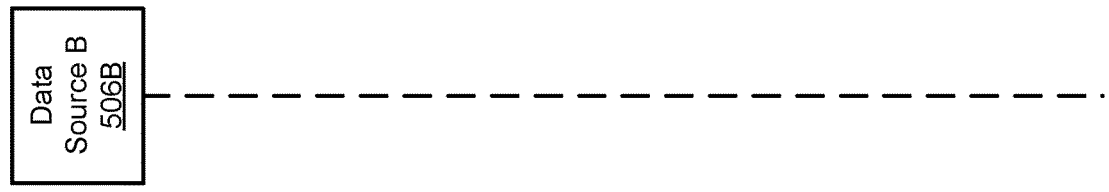
Figure 5O:
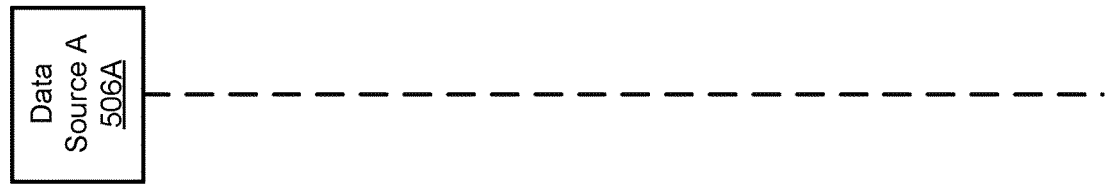
Figure 5O:
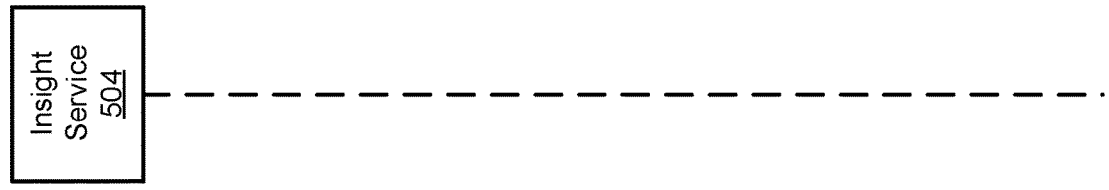
Figure 5O:
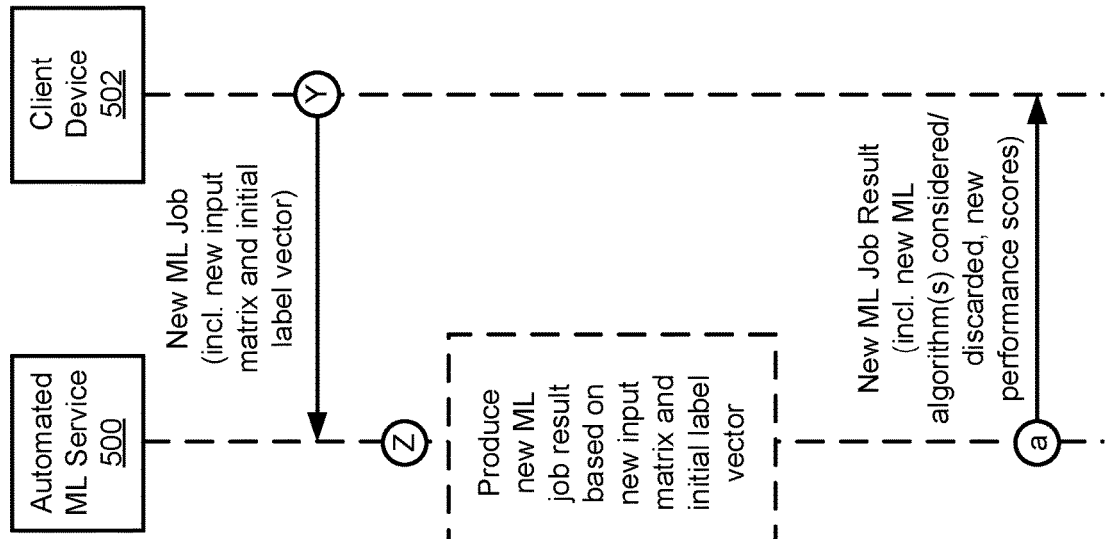

FIGS. 5A-5O show an example scenario in accordance with one or more embodiments disclosed herein. The example scenario, illustrated through FIGS. 5A-5O and described below, is explanatory purposes only and not intended to limit the scope disclosed herein.

Hereinafter, consider the following example scenario whereby an organization user, identified as Kate, seeks to apply machine learning (ML) to resolve a real-world problem (e.g., breast cancer detection via tumor analysis). To that end, Kate has collected a small dataset reflective of various tumor samples, where each tumor sample is representative of either a benign (i.e., non-cancerous), or a malignant (i.e., cancerous), tumor instance. The small dataset, further, specifies three (3) features (e.g., clump thickness, uniform cell size, and uniform cell shape) that Kate has selected as initial properties/factors/variables pertinent to discerning whether any given tumor is cancerous or non-cancerous (i.e., tied to one of two (2) available labels).

Further, though Kate has an initial input matrix (i.e., the small training/testing dataset) and an initial label vector (i.e., derived by manually associating an appropriate label to each of the tumor samples reflected in the small training/testing dataset), Kate is uncertain as to which ML algorithm(s) to employ in order to address her real-world problem. As such, Kate turns to an automated ML service, which proposes to not only automate the selection of the appropriate ML algorithm(s), but also automatically build one or more ML models from any selected ML algorithm(s), for her given whichever argument(s) (e.g., the initial input matrix and the initial label vector) Kate chooses to provide.

Moreover, following the submission and completion of a ML job to and by the automated ML service, Kate relies on the disclosed capability of metadata-based feature expansion for automated machine learning processes, by the insight service, to improve any performance shortcomings exhibited in the ML model(s) built by the automated ML service. Improvements in ML model performance, at least via embodiments disclosed herein, may be targeted through the selection or suggestion of additional feature(s) significant to the tackled real-world problem (e.g., breast cancer detection via tumor analysis).

Interactions amongst various actors—e.g., the Automated ML Service (500), a Client Device (502) operated by Kate, the Insight Service (504), and two separate data sources (i.e., Data Source A (506A) and Data Source B (506B))—are illustrated in conjunction with components shown across FIGS. 5A-5O and described (in an itemized manner) below. Said interactions, as well as processes performed on/by any particular actor may follow embodiments disclosed herein pertaining to metadata-based feature expansion for automated machine learning processes as applied to the circumstances of the example scenario.

Turning to FIG. 5A:
1. User Kate, operating the Client Device (502), submits an initial ML job to the Automated ML Service (500), where the initial ML job specifies the initial input matrix and the initial label vector (both described above)
2. The Automated ML Service (500) produces an initial ML job result based on the initial input matrix and the initial label vector, where the initial ML job result includes a list of four (4) ML algorithms (i.e., ML algorithms 1-4)—2 of which is designated as considered and 2 of which is designated as discarded—and a set of performance scores quantifying an evaluated performance of each considered ML algorithm in the list of ML algorithms
3. In response to the submitted initial ML job, the Automated ML Service (500) provides the initial ML job result to the Client Device (502) or, more specifically, to User Kate Turning to FIG. 5B:
4. User Kate, operating the Client Device (502), creates a feature query including the three (3) features (i.e., features 1-3) (e.g., clump thickness, uniform cell size, and uniform cell shape) reflected in the initial input matrix, the initial ML job result provided by the Automated ML Service (500), and the two (2) (unique) labels (i.e., labels 1 & 2) (e.g., cancerous and non-cancerous) reflected in the initial label vector
5. User Kate, operating the Client Device (502), submits the feature query to the Insight Service (504)

Turning to FIG. 5C:
6. The Insight Service (504) obtains a user profile for User Kate, where the user profile includes user access permissions associated with User Kate
7. The Insight Service (504) further obtains a metadata graph representative of an asset catalog
8. Based on each of features 1-3, the Insight Service (504) filters the metadata graph to identify node subsets 1-3 (e.g., feature 1→node subset 1; feature 2→node subset 2; feature 3→node subset 3) of a set of nodes, at least in part, forming the metadata graph, where each of node subsets 1-3 includes one or more nodes corresponding to asset catalog entry/entries each specifying asset metadata (or at least a portion thereof) matching, or semantically similar to, a respective feature Turning to FIG. 5D:

9. Based on each of labels 1 & 2, the Insight Service (504) filters the metadata graph to identify node subsets 4 & 5 (e.g., label 1→node subset 4; label 2→node subset 5) of a set of nodes, at least in part, forming the metadata graph, where each of node subsets 4 & 5 includes one or more nodes corresponding to asset catalog entry/entries each specifying asset metadata (or at least a portion thereof) matching, or semantically similar to, a respective label A. Based on each of ML algorithms 1-4, the Insight Service (504) filters the metadata graph to identify node subsets 6-9 (e.g., ML algorithm 1→node subset 6; ML algorithm 2→node subset 7; ML algorithm 3→node subset 8; ML algorithm 4→node subset 9) of a set of nodes, at least in part, forming the metadata graph, where each of node subsets 6-9 includes one or more nodes corresponding to asset catalog entry/entries each specifying asset metadata (or at least a portion thereof) matching, or semantically similar to, a respective ML algorithm Turning to FIG. 5E:

B. The Insight Service (504) generates a k-partite (i.e., multi-partite) metadata graph using node subsets 1-9

C. The Insight Service (504) identifies key nodes 1 & 2 in/of the k-partite metadata graph Turning to FIG. 5F:

D. The Insight Service (504) extracts a portion of asset metadata from an asset catalog entry corresponding to key node 1, where the portion of asset metadata includes dataset features 1-5 (reflected in a dataset 1), as well as stewardship information and compliance information also associated with dataset 1 (i.e., key asset 1)

E. The Insight Service (504) further extracts a portion of asset metadata from an asset catalog entry corresponding to key node 2, where the portion of asset metadata includes dataset features 1-7 (reflected in a dataset 2), as well as stewardship information and compliance information also associated with dataset 2 (i.e., key asset 2)

Turning to FIG. 5G:

F. The Insight Service (504) assesses each of features 1-3 against each of dataset features 1-5 (of dataset 1) and against each of dataset features 1-7 (of dataset 2), where the assessment results in the identification of a non-empty set specifying delta features 1-5, where delta features 1 & 2 (e.g., marginal adhesion and bare nuclei) are distinct features in dataset 1 that do not match or are not semantically similar to any of features 1-3 and dataset features 1-7 (of dataset 2), and where delta features 3-5 (e.g., bland chromatin, mitoses, and normal nucleoli) are distinct features in dataset 2 that do not match or are not semantically similar to any of features 1-3 and dataset features 1-5 (of dataset 1)

Turning to FIG. 5H:

G. The Insight Service (504) assesses the user access permissions (associated with User Kate) against the compliance information for key assets 1 & 2 (i.e., datasets 1 & 2) mapped respectively to key nodes 1 & 2, where the assessment results in the production of access remarks (e.g., datasets 1 & 2 are both deemed accessible to/by User Kate) concerning key assets 1 & 2

H. To ascertain an asset availability for dataset 1, the Insight Service (504) submits an asset availability query to Data Source A (506A) which is identified as the host of dataset 1 amongst the asset metadata thereof, where the asset availability query includes a unique asset identifier (dataset 1 ID) associated with dataset 1

I. To ascertain an asset availability for dataset 2, the Insight Service (504) submits an asset availability query to Data Source B (506B) which is identified as the host of dataset 2 amongst the asset metadata thereof, where the asset availability query includes a unique asset identifier (dataset 2 ID) associated with dataset 2

Turning to FIG. 5I:

J. In response to the submitted asset availability query regarding dataset 1, Data Source A (506A) returns an asset availability reply to the Insight Service (504), where the asset availability reply specifies an asset availability state indicating that dataset 1 is available K. In response to the submitted asset availability query regarding dataset 2, Data Source B (506B) returns an asset availability reply to the Insight Service (504), where the asset availability reply specifies an asset availability state indicating that dataset 2 is available L. The Insight Service (504) produces availability remarks concerning datasets 1 & 2 based on the returned asset availability replies Turning to FIG. 5J:

M. The Insight Service (504) subsequently creates a feature query result including a manifest listing datasets 1 & 2, the produced access remarks, the produced availability remarks, identified delta features 1-5, and a new record ID (to be associated with a new query record intended to track various query state related to the submitted feature query)

N. In response to the submitted feature query, the Insight Service (504) provides the feature query result to the Client Device (502) or, more specifically, to User Kate Turning to FIG. 5K:

O. The Insight Service (504) creates the new query record to maintain the various tracked query state related to the submitted feature query, where the various tracked query state includes features 1-3, labels 1 & 2, the initial ML job result, the generated k-partite metadata graph, identified key nodes 1 & 2, identified delta features 1-5, and the new record ID Turning to FIG. 5L:

P. User Kate, operating the Client Device (502), submits an instantiation request (for datasets 1 & 2) to the Insight Service (504)

Q. Based on the information presented in the produced access remarks (indicating that dataset 1 is accessible to/by User Kate) and the produced availability remarks (indicating that dataset 1 is available), the Insight Service (504) submits a retrieval request for dataset 1 to the host thereof (Data Source A (506A))

R. In response to the submitted retrieval request regarding dataset 1, Data Source A (506A) returns dataset 1 to the Insight Service (504)

S. Based on the information presented in the produced access remarks (indicating that dataset 2 is accessible to/by User Kate) and the produced availability remarks (indicating that dataset 2 is available), the Insight Service (504) submits a retrieval request for dataset 2 to the host thereof (Data Source B (506B))

T. In response to the submitted retrieval request regarding dataset 2, Data Source B (506B) returns dataset 2 to the Insight Service (504)

Turning to FIG. 5M:

U. In response to the submitted instantiation request, the Insight Service (504) provides access to datasets 1 & 2 via a select delivery mode (e.g., digital reference link, archive file, etc.) to the Client Device (502) or, more specifically, to User Kate V. User Kate, operating the Client Device (502), identifies the portion (e.g., two columns) of dataset 1 reflecting delta features 1 & 2

W. User Kate, operating the Client Device (502), further identifies the portion (e.g., three columns) of dataset 2 reflecting delta features 3-5

Turning to FIG. 5N:

X. User Kate, operating the Client Device (502), creates a new input matrix from the initial input matrix and based on the identified portions of datasets 1 & 2, where the new input matrix reflects features 1-3 originally selected by User Kate and delta (e.g., supplemental) features 1-5 selected/suggested by the Insight Service (504)

Turning to FIG. 5O:

Y. User Kate, operating the Client Device (502), submits a new ML job to the Automated ML Service (500), where the new ML job specifies the new input matrix and the initial label vector Z. The Automated ML Service (500) produces a new ML job result based on the new input matrix and the initial label vector, where the new ML job result includes a new list of four (4) ML algorithms (i.e., ML algorithms 1-4)—3 of which is designated as considered and 1 of which is designated as discarded—and a set of performance scores quantifying an evaluated performance of each considered ML algorithm in the list of ML algorithms a. In response to the submitted new ML job, the Automated ML Service (500) provides the new ML job result to the Client Device (502) or, more specifically, to User Kate While the embodiments disclosed herein have been described with respect to a limited number of embodiments, those skilled in the art, having benefit of this disclosure, will appreciate that other embodiments can be devised which do not depart from the scope disclosed herein as disclosed herein. Accordingly, the scope disclosed herein should be limited only by the attached claims.

What is claimed is:

1. A method for processing feature queries, the method comprising:
receiving a feature query comprising a set of features;
obtaining a metadata graph representative of an asset catalog;
filtering, based on each feature in the set of features, the metadata graph to identify a set of node subsets;
generating a k-partite metadata graph using the set of node subsets; and
identifying a set of delta features based on the k-partite metadata graph, wherein identifying comprises:
identifying a key node in the k-partite metadata graph;
extracting asset metadata from an asset catalog entry of the asset catalog,
wherein the asset metadata describes a key asset and comprises a second set of features,
wherein the asset catalog entry corresponds to the key node;
assessing each feature in the set of features against each second feature in the second set of features to identify an empty set;
identifying, based on identifying the empty set, a strong adjacent node, respective to the key node, in the k-partite metadata graph;
extracting second asset metadata from a second asset catalog entry of the asset catalog,
wherein the second asset metadata describes a strong asset and comprises a third set of features,
wherein the second asset catalog entry corresponds to the strong adjacent node; and
assessing each feature in the set of features against each third feature in the third set of features to identify a non-empty set,
wherein the non-empty set comprises one selected from a group of delta features consisting of the set of delta features and a subset of the set of delta features.

2. The method of claim 1, wherein the set of delta features comprises at least one second feature in the second set of features that is distinct from each feature in the set of features.

3. The method of claim 1, wherein the key node is one selected from a group of nodes comprising a super node, a most connected node in a metadata subgraph, and another node satisfying an identification criterion.

4. The method of claim 1, wherein the feature query further comprises a machine learning (ML) job result at least listing a set of ML algorithms, and wherein the method further comprises:
prior to generating the k-partite metadata graph:
filtering, based on each ML algorithm in the set of ML algorithms, the metadata graph to identify a second set of node subsets,
wherein the k-partite metadata graph is generated further using the second set of node subsets.

5. The method of claim 1, the method further comprising:
after identifying the set of delta features:
creating a feature query result comprising a manifest of assets and the set of delta features,
wherein the manifest of assets lists the key asset; and
providing the feature query result in response to the feature query.

6. The method of claim 5, the method further comprising:
prior to obtaining the metadata graph:
obtaining a user profile for an organization user,
wherein the feature query originates from the organization user and the user profile comprises user access permissions associated with the organization user; and
prior to creating the feature query result:
performing an assessment of the user access permissions against compliance information associated with the key asset,
wherein the asset metadata further comprises the compliance information; and
producing access remarks based on the assessment,
wherein the feature query result further comprises the access remarks.

7. The method of claim 6, the method further comprising:
after producing the access remarks:
determining an asset availability for the key asset; and
producing availability remarks comprising the asset availability,
wherein the feature query result further comprises the availability remarks.

8. The method of claim 1, wherein the non-empty set comprises the set of delta features, and wherein the set of delta features comprises at least one third feature in the third set of features that is distinct from each feature in the set of features.

9. The method of claim 1, wherein the non-empty set comprises the subset of the set of delta features, and wherein identifying the set of delta features based on the k-partite metadata graph, further comprises:
   identifying, further based on identifying the empty set, a weak adjacent node, respective to the key node, in the k-partite metadata graph;
   extracting third asset metadata from a third asset catalog entry of the asset catalog,
      wherein the third asset metadata describes a weak asset and comprises a fourth set of features,
      wherein the third asset catalog entry corresponds to the weak adjacent node; and
   assessing each feature in the set of features against each fourth feature in the fourth set of features to identify a second non-empty set,
      wherein the second non-empty set comprises a second subset of the set of delta features.

10. The method of claim 9, wherein the subset of the set of delta features comprises at least one third feature in the third set of features that is distinct from each feature in the set of features and each fourth feature in the fourth set of features, and wherein the second subset of the set of delta features comprises at least one fourth feature in the fourth set of features that is distinct from each feature in the set of features and each third feature in the third set of features.

11. A non-transitory computer readable medium (CRM) comprising computer readable program code, which when executed by a computer processor, enables the computer processor to perform a method for processing feature queries, the method comprising:
   receiving a feature query comprising a set of features;
   obtaining a metadata graph representative of an asset catalog;
   filtering, based on each feature in the set of features, the metadata graph to identify a set of node subsets;
   generating a k-partite metadata graph using the set of node subsets; and
   identifying a set of delta features based on the k-partite metadata graph, wherein identifying comprises:
      identifying a key node in the k-partite metadata graph;
      extracting asset metadata from an asset catalog entry of the asset catalog,
         wherein the asset metadata describes a key asset and comprises a second set of features,
         wherein the asset catalog entry corresponds to the key node;
      assessing each feature in the set of features against each second feature in the second set of features to identify an empty set;
      identifying, based on identifying the empty set, a strong adjacent node, respective to the key node, in the k-partite metadata graph;
      extracting second asset metadata from a second asset catalog entry of the asset catalog,
         wherein the second asset metadata describes a strong asset and comprises a third set of features,
         wherein the second asset catalog entry corresponds to the strong adjacent node; and
      assessing each feature in the set of features against each third feature in the third set of features to identify a non-empty set,
         wherein the non-empty set comprises one selected from a group of delta features consisting of the set of delta features and a subset of the set of delta features.

12. The non-transitory CRM of claim 11, wherein the set of delta features comprises at least one second feature in the second set of features that is distinct from each feature in the set of features.

13. The non-transitory CRM of claim 11, wherein the key node is one selected from a group of nodes comprising a super node, a most connected node in a metadata subgraph, and another node satisfying an identification criterion.

14. The non-transitory CRM of claim 11, wherein the non-empty set comprises the subset of the set of delta features, and wherein identifying the set of delta features based on the k-partite metadata graph, further comprises:
   identifying, further based on identifying the empty set, a weak adjacent node, respective to the key node, in the k-partite metadata graph;
   extracting third asset metadata from a third asset catalog entry of the asset catalog,
      wherein the third asset metadata describes a weak asset and comprises a fourth set of features,
      wherein the third asset catalog entry corresponds to the weak adjacent node; and
   assessing each feature in the set of features against each fourth feature in the fourth set of features to identify a second non-empty set,
      wherein the second non-empty set comprises a second subset of the set of delta features.

15. A system, the system comprising:
   a client device; and
   an insight service operative connected to the client device, and comprising a computer processor configured to perform a method for processing feature queries, the method comprising:
      receiving, from the client device, a feature query comprising a set of features;
      obtaining a metadata graph representative of an asset catalog;
      filtering, based on each feature in the set of features, the metadata graph to identify a set of node subsets;
      generating a k-partite metadata graph using the set of node subsets; and
      identifying a set of delta features based on the k-partite metadata graph, wherein identifying comprises:
         identifying a key node in the k-partite metadata graph;
         extracting asset metadata from an asset catalog entry of the asset catalog,
            wherein the asset metadata describes a key asset and comprises a second set of features,
            wherein the asset catalog entry corresponds to the key node;
         assessing each feature in the set of features against each second feature in the second set of features to identify an empty set;
         identifying, based on identifying the empty set, a strong adjacent node, respective to the key node, in the k-partite metadata graph;
         extracting second asset metadata from a second asset catalog entry of the asset catalog,
            wherein the second asset metadata describes a strong asset and comprises a third set of features,
            wherein the second asset catalog entry corresponds to the strong adjacent node; and assessing each feature in the set of features against each third feature in the third set of features to identify a non-empty set,
wherein the non-empty set comprises one selected from a group of delta features consisting of the set of delta features and a subset of the set of delta features.

\* \* \* \* \*